United States Patent
Ohara et al.

(10) Patent No.: US 7,906,219 B2
(45) Date of Patent: Mar. 15, 2011

(54) METALLIC GLASS LAMINATES, PRODUCTION METHODS AND APPLICATIONS THEREOF

(75) Inventors: Masaki Ohara, Chiyoda-ku (JP); Takanori Igarashi, Tokyo (JP); Masaharu Sugiyama, Tokyo (JP); Seiji Yamada, Tokyo (JP); Kenichi Takahashi, Tokyo (JP); Atsuo Mochizuki, Tokyo (JP); Yoshitsugu Motoe, Tokyo (JP); Akihisa Inoue, Miyagi (JP); Hisamichi Kimura, Miyagi (JP)

(73) Assignees: Topy Kogyo Kabushiki Kaisha, Chiyoda-ku, Tokyo (JP); Tohoku University, Sendai-shi, Miyagi (JP); Akihisa Inoue, Sendai-shi, Miyagi (JP)

( * ) Notice: Subject to any disclaimer, the term of this patent is extended or adjusted under 35 U.S.C. 154(b) by 400 days.

(21) Appl. No.: 10/599,293
(22) PCT Filed: Mar. 25, 2005
(86) PCT No.: PCT/JP2005/005528
§ 371 (c)(1), (2), (4) Date: Mar. 20, 2008
(87) PCT Pub. No.: WO2005/093113
PCT Pub. Date: Oct. 6, 2005

(65) Prior Publication Data
US 2008/0248222 A1    Oct. 9, 2008

(30) Foreign Application Priority Data

| Mar. 25, 2004 | (JP) | 2004-089612 |
| Sep. 2, 2004 | (JP) | 2004-255456 |
| Oct. 26, 2004 | (JP) | 2004-310862 |
| Dec. 8, 2004 | (JP) | 2004-355520 |
| Jan. 7, 2005 | (JP) | 2005-002930 |

(51) Int. Cl.
*B32B 3/00* (2006.01)
*B32B 15/00* (2006.01)
*B32B 15/18* (2006.01)
*C23C 4/00* (2006.01)
*C23C 4/06* (2006.01)
*C23C 4/08* (2006.01)

(52) U.S. Cl. ..... 428/615; 428/681; 428/687; 428/304.4; 427/455

(58) Field of Classification Search .......... None
See application file for complete search history.

(56) References Cited

U.S. PATENT DOCUMENTS
4,974,768 A   12/1990  Ebata
(Continued)

FOREIGN PATENT DOCUMENTS
CN   86107901   5/1987
(Continued)

OTHER PUBLICATIONS
Japanese Patent Abstract No. 2001-303218 published Oct. 31, 2001, one page.
(Continued)

*Primary Examiner* — Jennifer C McNeil
*Assistant Examiner* — Jason L Savage
(74) *Attorney, Agent, or Firm* — Rankin, Hill & Clark LLP

(57) ABSTRACT

A metallic glass laminate of the present invention is characterized in that a metallic glass layer of amorphous phase is formed on the substrate surface, and there is no continuous pore (pinhole) through the metallic glass layer. The metallic glass laminate is preferably obtained by solidification and lamination of at least part of the metallic glass powder in the molten state or in the supercooled liquid state on the substrate surface. Because of the dense metallic glass layer of homogenous amorphous phase, the functionalities of metallic glass such as corrosion resistance and wear resistance can be satisfactorily provided. A thick and a large-area metallic glass layer can be formed. The metallic glass layer can also be formed into various shapes within the supercooled liquid temperature range. In addition, a metallic glass bulk can be obtained by removing the substrate. The metallic glass laminate and the metallic glass bulk are utilized for a fuel cell separator, a hydrogen separation membrane, a hydrogen sensor, a solder-corrosion resisting member, etc.

37 Claims, 17 Drawing Sheets

U.S. PATENT DOCUMENTS

| | | | |
|---|---|---|---|
| 5,429,725 | A | 7/1995 | Thorpe et al. |
| 2003/0164209 | A1 | 9/2003 | Poon et al. |

FOREIGN PATENT DOCUMENTS

| | | |
|---|---|---|
| EP | 0223202 | 5/1987 |
| EP | 0768528 A2 | 4/1997 |
| JP | 61-170546 | 8/1986 |
| JP | 3-158446 | 7/1991 |
| JP | 8-309803 | 11/1996 |
| JP | 9-195017 | 7/1997 |
| JP | 2001-303218 | 10/2001 |
| JP | 2002-105607 | 4/2002 |
| JP | 2003-253408 | 9/2003 |
| JP | 2003-253417 | 9/2003 |
| JP | 2004-273314 | 9/2004 |
| JP | 2004-292923 | 10/2004 |

OTHER PUBLICATIONS

Japanese Patent Abstract No. 2000-045058 published Feb. 15, 2000, one page.
Japanese Patent Abstract No. 58-217671 published Dec. 17, 1983, one page.
Japanese Patent Abstract No. 07-112272 published May 2, 1995, one page.
Japanese Patent Abstract No. 2000-169947 published Jun. 20, 2000, one page.
Japanese Patent Abstract No. 06-091144 published Apr. 5, 1994, one page.
Japanese Patent Abstract No. 2005-164584 published Jun. 23, 2005, one page.
Japanese Patent Abstract No. 2005-173558 published Jun. 30, 2005, one page.
Japanese Patent Abstract No. 05-131279 published May 28, 1993, one page.
Japanese Patent Abstract No. 11-033746 published Feb. 9, 1999, one page.
Translation (partial) of "Historical Background and Alloy Systems of Metallic Glass Alloys," Functional Materials, vol. 22, No. 6, pp. 5-9 (2002), six pages.
Japanese Patent Abstract No. 03-158446 published Jul. 8, 1991, one page.
Japanese Patent Abstract No. 09-279318 published Oct. 28, 1997, two pages.
Japanese Patent Abstract No. 2004-042017 published Feb. 12, 2004, two pages.
Japanese Patent Abstract No. 61-217568 published Sep. 27, 1986, one page.
Japanese Patent Abstract No. 05-195107 published Aug. 3, 1993, one page.
Japanese Patent Abstract No. 63-004031 published Jan. 9, 1988, one page.
Japanese Patent Abstract No. 08-176783 published Jul. 9, 1996, one page.
Translation (partial) of Otsubo et al., Japan Thermal Spraying Society, National Conference (Fall), pp. 37-38, three pages.
International Search Report for PCT/JP2005/005528, dated Jul. 19, 2005, two pages.
Japanese Patent Abstract for Publication No. 2001-303218 published Oct. 31, 2001, ten pages.
Kim et al. "Amorphous phase formation of Zr-based alloy coating by HVOF spraying process," Journal of Materials Science 36 (2001) pp. 49-54.
Otsubo et al., "Formation of Amorphous Fe-Cr-Mo-8P-2C Coatings by the High Velocity Oxy-Fuel Process," Journal of Thermal Spray Technology, vol. 9(4), Dec. 2000, pp. 494-498.
Branagan et al., "Wear-Resistant Amorphous and Nancomposite Steel Coatings," Metallurgical and Materials Transactions, vol. 32A, Oct. 2001, pp. 2615-2621.
Supplementary European Search Report for corresponding EP 05726978 mailed Nov. 18, 2009, five pages.
Japanese Patent Abstract for Publication No. 08-309803 published Nov. 11, 1996, 14 pages.
Japanese Patent Abstract for Publication No. 2004-273314 published Sep. 9, 2004, 18 pages.
Japanese Patent Abstract for Publication No. 2004-292923 published Oct. 21, 2004, 10 pages.
Japanese Abstract for Publication No. 61-170546 published Aug. 1, 1986, 1 page.
Japanese Abstract for Publication No. 2003-253417 published Sep. 10, 2003, 19 pages.
Hara et al. "Hydrogen Permeation Properties of Metallic Glass Membranes," Institute for Materials Research, Jun. 2004, pp. 13-14.
Yamaura et al. "Hydrogen Permeation Characteristics of Melt-Spun Ni-Nb-Zr Amorphous Alloy Membranes," Materials Transactions, 2003, vol. 44, No. 9, pp. 1885-1890.
Yamaura et al. "Hydrogen Permeation Properties of Ni-Nb-Zr System Metallic Glass Arays," Materials Transactions, Mar. 2003, p. 346.
Japanese Abstract for Publication No. 03-158446 published Jul. 8, 1991, one page.
Japanese Abstract for Publication No. 09-195017 published Jul. 29, 1997, nine pages.
Japanese Abstract for Publication No. 2002-105607 published Apr. 10, 2002, seven pages.
Japanese Abstract for Publication No. 2003-253408 published Sep. 10, 2003, ten pages.

(a)

(b)

METALLIC GLASS LAMINATES, PRODUCTION METHODS AND APPLICATIONS THEREOF

RELATED APPLICATIONS

This application claims the priority of Japanese Patent Application No. 2004-89612 filed on Mar. 25, 2004, Japanese Patent Application No. 2004-255456 filed on Sep. 2, 2004, Japanese Patent Application No. 2004-310862 filed on Oct. 26, 2004, Japanese Patent Application No. 2004-355520 filed on Dec. 8, 2004, and Japanese Patent Application No. 2005-2930 filed on Jan. 7, 2005, which are incorporated herein by reference.

FIELD OF THE INVENTION

The present invention relates to metallic glass laminates, and in particular, relates to metallic glass laminates that have a metallic glass layer of a homogeneous and dense amorphous phase on the substrate surface and are excellent in bonding, durability, corrosion resistance, and wear resistance, and also relates to their production method. The present invention also relates to the application of these metallic glass laminates.

For example, a metallic glass bulk can be obtained if the substrate is removed from the metallic glass laminate.

In addition, the present invention relates to die-forming articles, the surface of which has a precise concavo-convex pattern or a mirror surface. In particular, the present invention relates to die-forming articles made of a laminate, in which a metallic glass layer that is excellent in strength, corrosion resistance, wear resistance, and electrochemical properties is laminated on the substrate surface.

In addition, the present invention relates to porous body-metallic glass composite laminates that have a metallic glass layer on the porous base material. In particular, the present invention relates to composite laminates that are applicable to a gas separation membrane with which a specific gas such as hydrogen gas can be selectively isolated from a gas mixture.

In addition, the present invention relates to improvement in solder-corrosion resistance of members that are used on soldering and contacted with molten solder, such as a soldering iron tip and solder bath. In particular, the present invention relates to a solder-corrosion resistant member, which also has excellent corrosion resistance especially against molten lead-free solder and realizes a long life.

BACKGROUND ART

Metallic materials have shaped big industries in the fields of building materials, bridges, railroads, vehicles, automobile parts, etc. However, metals have been replaced with plastics such as FRP for the reduction of weight. Under these circumstances, the demand for metals has diversified, in recent years, because of the wide use of electronics and the rise of leisure industry, and also from the viewpoint of environment and energy. Various new metal materials have been developed from the perspective of the reduction of weight and the achievement of high functionality. The usage development is also in progress by applying composite functionality such as corrosion resistance and durability as well as electrical conductivity and thermal conductivity, which plastics cannot replace.

For metals, there is a bonding technology as a specific processing technology for surface treatment. Bonding is one of the very important processing technologies as well as cutting and bending. As bonding, there are mechanical bonding, adhesion, and welding. Its purpose is to achieve composite functions such as surface improvement, surface gradient, and lamination of substrates such as bulk metals and ceramics. For example, chromium plating is a typical example of anticorrosion surface treatment. Recently, however, a replacement technology for the surface treatment is in demand from the viewpoint of the wastewater treatment. In addition, for the improvement of sliding, the adhesion to the substrate is an issue for a new material such as DLC film and others.

Various materials have been investigated as laminating materials such as surface treatment material and cladding material in order to add characteristics such as toughness, antibacterial property, and high class touch as well as corrosion prevention, rust prevention, and wear resistance.

It has been known that allowing the metal to be amorphous is advantageous in achieving these functions. However, the amorphous state of conventional amorphous metal (amorphous alloy) is unstable and it easily crystallizes.

In recent years, as a metallic material to solve the problem, metallic glass was discovered and brought to attention. The metallic glass (glass alloy) may be said to be a kind of amorphous alloy in the broad sense. However, the metallic glass has been distinguished from the conventional amorphous alloy in that it shows a distinct glass transition and a stable supercooled liquid state in a wide temperature range. Lately, there is a view that the metallic glass is aggregates of nanocrystals. Thus, it is considered that the fine structure of the amorphous state of metallic glass is different from the amorphous state of the conventional amorphous metal.

For the bonding between metal and substrate, welding or pressure welding methods are mainly used. The interface affinity of both constitutions exerts a strong influence on durability such as adhesion strength and peeling resistance. In addition, because respective materials have characteristic thermal expansion coefficients, the matching of both thermal expansion coefficients are very important.

The thermal expansion coefficient of metallic glass is lower than that of metal owing to its metallographic structure, and metallic glass has good ductility and excellent interface forming capability. Thus, metallic glass is utilized for the bonding of metals by making full use of these characteristics of metallic glass.

In the Patent Literature 1 mentioned-below, for example, a bonding method is disclosed in which metallic glass is heated to the supercooled liquid temperature range and then metals are bonded with pressure. By this method, however, it is difficult to maintain face-to-face contact between the metal surfaces because of the crystallization and deformation of the metallic glass.

In the Patent Literature 2 mentioned-below, a bonding method is disclosed in which the steps of heating, pressurization, and cooling of metallic glass are stipulated in detail in order to solve the problems of the Patent Literature 1. However, this method is also a bonding method between metal bulks, and it cannot be satisfactorily used for various applications.

In addition, the prevention of crystallization is a big issue especially when an amorphous layer is formed on the substrate.

In the case of a conventional amorphous alloy, if the cooling rate of the melt is slow, a crystalline phase is formed and it is difficult to obtain a homogeneous amorphous layer. The formation of a crystalline phase is not desirable because there is a negative effect to corrosion resistance, etc. In the case of metallic glass also, a high-grade coating has not been achieved as with normal crystalline alloy and amorphous alloy.

Patent literature 1: Japanese Unexamined Patent Publication H 5-131279

Patent literature 2: Japanese Unexamined Patent Publication H 11-33746

DISCLOSURE OF THE INVENTION

Problem to be Solved by the Invention

The present invention was made in view of the above-mentioned background art. Thus, an object of the present invention is to provide a laminate, with excellent bonding property and durability, of a highly-reliable dense amorphous metallic glass layer and a substrate.

It is said to be able to obtain metallic glass bulk of amorphous phase, however, if the size of the bulk material is large, cooling takes time and the cooling rate becomes slow. As a result, it is difficult to obtain a large bulk material without crystallization; thus, the composition of the metallic glass and the production conditions of a bulk are very limited. Thus, a simple method is desired by which the bulk size can be freely set, and a metallic glass bulk of a homogeneous amorphous phase can be obtained.

Thus, an object of the present invention is to provide a metallic glass bulk of a homogeneous amorphous phase and also to provide an easy production method thereof.

If a metallic glass can be laminated on the substrate of any size, and a desired pattern can be easily formed on the metallic glass layer surface, metallic glass functionality can be added without the limitation of the substrate size. In addition, if a light material and general-purpose material are used as a substrate for the laminate, the reduction of weight and the reduction of material cost can be achieved.

Thus, an object of the present invention is to provide a die-forming article that is a laminate in which a metallic glass is laminated on the substrate surface and the metallic glass surface has precise convexo-concaves or a mirror surface, and also to provide an easy production method thereof.

It is known that some metallic glasses have hydrogen storage ability. If the metallic glass can be laminated on a surface of the porous base material without forming a pinhole, it may be used as a hydrogen separation membrane. However, this type of laminate has never been obtained.

Thus, an object of the present invention is to provide a composite laminate that is made of a porous base material and a thin metal film and is usable as a gas separation membrane and also to provide a simple production method thereof.

In recent years, members for soldering use, which have high corrosion resistance against molten solder, especially against molten lead-free solder, is in strong demand. It is important to densely coat the member surface with a material that has excellent corrosion resistance against molten solder. However, a satisfactory material has never been obtained. In addition, there has been no report concerning the corrosion resistance of metallic glass against molten solder.

Thus, an object of the present invention is to provide a solder-corrosion resistant material that can achieve excellent corrosion resistance against molten solder, especially against molten lead-free solder and can realize a long life.

Means of Solving the Problem

The present inventors have diligently studied and found that it is possible to form a very dense amorphous metallic glass layer on the substrate by laminating metallic glass powder on the bulk substrate by a specific method. The inventors have also found that a metallic glass layer of an amorphous phase can be laminated to a thickness film and that a metallic glass bulk can be obtained by removing the substrate from such a laminate.

Thus, the first subject matter of the present invention is a metallic glass laminate, wherein a metallic glass layer of an amorphous phase is formed on the substrate surface and no continuous pore (pinhole) that passes through metallic glass layer is present, and a metallic glass bulk that can be obtained by removing the substrate from the above-mentioned metallic glass laminate.

The above-mentioned metallic glass layer can be formed by the solidification and lamination of at least part of the metallic glass powder in a molten state or supercooled liquid state on the substrate surface. As a lamination method, for example, thermal spraying can be suitably used.

The present inventors have found, in the above-mentioned metallic glass laminate, that an amorphous metallic glass layer can be firmly laminated on a substrate to form a thick film and that the pattern of a die can be nicely transferred to the metallic glass surface by pressing the surface of the metallic glass layer with the die in the supercooled liquid temperature range.

Thus, the second subject matter of the present invention is a die-forming article, wherein a metallic glass layer is laminated on the substrate surface, and the surface of the metallic glass layer has a concavo-convex pattern and/or a smooth surface with mirror finish.

In addition, the present inventors have found, in the above-mentioned metallic glass laminate, that a dense thermal sprayed coating of metallic glass, without pinholes, of a homogeneous amorphous phase could be firmly and easily laminated on the surface of the porous base material by thermal spraying of a metallic glass on the surface of the porous base material used as a substrate. The present inventors have also found that if a metallic glass with selective permeability for a specific gas such as hydrogen is used, the obtained composite laminate of porous base material and metallic glass could be satisfactorily used as a gas separation membrane even without sealing.

Thus, the third subject matter of the present invention is a composite laminate, wherein a thermal sprayed coating of metallic glass without pinholes is laminated on the surface of the porous base material.

The present inventors have diligently studied the antierosion performance, high-temperature tolerance, anticorrosion performance, and wear resistance against molten solder. As a result, the present inventors have found that the amorphous metallic glass coating had excellent corrosion resistance against molten solder.

Thus, the fourth subject matter of the present invention is a solder-corrosion resistant member, wherein a metallic glass coating of an amorphous phase is formed on the molten solder contact surface or as an underlayer of the molten solder contact surface.

The metallic glass laminate of the present invention can be suitably applied to the above-described die-forming articles, composite laminates, and solder-corrosion resistant members.

EFFECT OF THE INVENTION

In the metallic glass laminate of the present invention, a metallic glass layer of an amorphous phase is formed on the substrate surface, and there is no continuous pore (pinhole), which passes through the metallic glass layer. Because the metallic glass layer can be firmly bonded on the substrate, the excellent functionalities of metallic glass such as corrosion resistance and wear resistance can be effectively provided to the substrate. The metallic glass laminate of the present invention can be produced by high-velocity oxygen-fuel thermal spraying, and a metallic glass layer can be directly formed on the surface of the substrate. In addition, it is possible to form a thick large-area coating of metallic glass without limitation in the thickness and area. If the substrate is removed from the metallic glass laminate, it is possible to easily obtain a bulk material.

In addition, a cast article that has functionalities of the metallic glass on the substrate can be obtained by laminating a metallic glass layer on the substrate and pressing a desired pattern, in the supercooled liquid temperature range, on the surface of the metallic glass to transfer the pattern. If a light material and general-purpose material are used as a substrate for the laminate, the reduction of weight and the reduction of material cost can be achieved. In addition, a thick metallic glass layer can be easily and firmly laminated on the substrate by thermal spraying of metallic glass powder, and it is also possible to form a large-area metallic glass layer.

In addition, a dense thermal sprayed coating of metallic glass, without pinholes, of a homogeneous amorphous phase can be firmly and directly laminated on the surface of a porous base material by high-velocity oxygen-fuel thermal spraying of metallic glass particles with on the porous base material. Accordingly, if a metallic glass with gas selective permeability is used, it can be satisfactorily used as a gas separation membrane even without sealing, for example, hydrogen separation membrane. In the present invention, a thermal sprayed coating is obtained as a homogeneous amorphous phase; thus, the hydrogen embrittlement is low, and the corrosion resistance and the strength are excellent compared with crystalline metal. In addition, the high-velocity oxygen-fuel thermal spraying can be conducted in the atmosphere; therefore, the production of coatings is easy.

In the solder-corrosion resistant member of the present invention, a dense high corrosion resistant coating is formed on the surface that contacts the molten solder. Therefore, even when lead-free solder is used, the corrosion at a high temperature is very low, thus leading to a drastically long life.

BEST MODE FOR CARRYING OUT THE INVENTION

1. Metallic Glass

Figure 1:
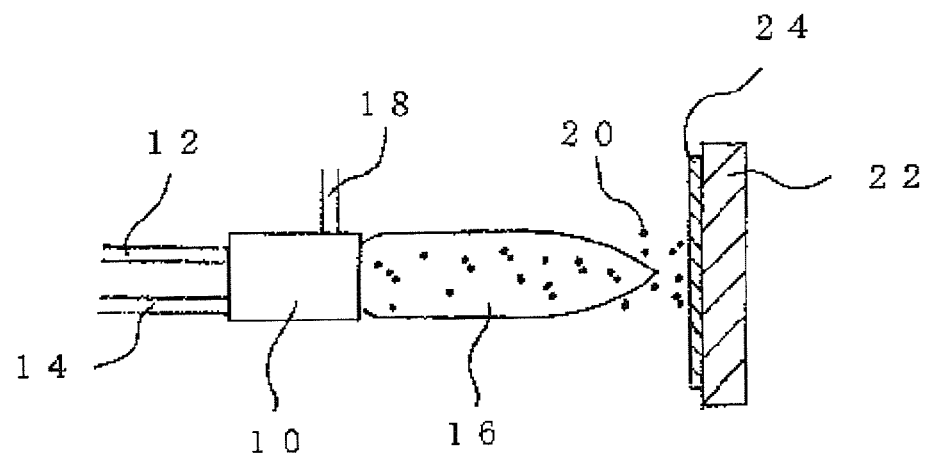
FIG. 1 is a schematic view of one example of a high-velocity oxygen-fuel thermal spraying (HVOF) system.

Since Fe—P—C system amorphous alloys were developed in the 1960s, numerous amorphous alloys have been produced. For example, (Fe, Co, Ni)—P—B, (Fe, Co, Ni)—Si—B, (Fe, Co, Ni)-M(Zr, Hf, Nb), and (Fe, Co, Ni)-M(Zr, Hf, Nb)—B system amorphous alloys have been known. Because these alloys are magnetic, the application as amorphous magnetic materials has been expected.

However, because the supercooled liquid temperature range for any of these conventional amorphous alloys is very narrow, an amorphous material can be formed only with a rapid cooling method, which is called the single rolling method, at the cooling rate of $10^5$ K/s level. The thickness of an alloy produced with rapid cooling such as the above single rolling method was equal to or less than about 50 μm, the obtained alloy was ribbon-like, and a bulk amorphous solid could not be obtained. A sintered material obtained by crushing the ribbon and sintering was porous, and it was unstable against heat cycle and impact; thus, there was a problem of crystallization taking place. Therefore, it cannot be used as an anti-corrosion anti-wear surface lining material or a bulk component, which are used under severe conditions.

In recent years, alloys that have a relatively wide supercooled liquid temperature range and solidify to a glass phase (amorphous phase) through a supercooled liquid state even when the molten metal is cooled at relatively slow cooling rate of about 0.1-100 K/s were discovered. These alloys are called metallic glass or glass alloy, and they are distinguished from the conventional amorphous alloy.

Metallic glass is defined as a metal alloy that is (1) ternary or more than ternary and has a (2) wide supercooled liquid temperature range. The metallic glass has an extremely high level of performance in properties including corrosion resistance and wear resistance, and the amorphous solid can be obtained by slow cooling. Lately, there is a view that the metallic glass is an aggregate of nanocrystals, and it is considered that the fine structure of metallic glass in an amorphous state is different from an amorphous state of the conventional amorphous metal.

Metallic glass is characterized by its exhibition of a distinct glass transition and a wide supercooled liquid temperature range, when it is heated, before crystallization.

When the thermal behavior of a metallic glass is examined with a DSC (differential scanning calorimeter), a broad wide endothermic band appears, with an increase in temperature, starting from the glass transition temperature (Tg) and then a sharp exothermic peak appears at the crystallization initiation temperature (Tx). Upon further heating, an endothermic peak appears at the melting point (Tm). Depending upon the metallic glass, respective temperatures are different. The temperature region between Tg and Tx, namely, $\Delta Tx=Tx-Tg$, is the supercooled liquid temperature range. One characteristic of metallic glass is that $\Delta Tx$ is 10-130° C. and it is very large. The larger the $\Delta Tx$, the higher the stability of the supercooled liquid state with respect to crystallization. In the case of the conventional amorphous alloy, this type of thermal behavior is not observed and $\Delta Tx$ is approximately zero.

The stability of the supercooled liquid state is high in the case of metallic glass. Therefore, even when the metallic glass is cooled from the molten state to the temperature lower than the melting point, solidification does not take place. Thus, the time to be able to stay at a supercooled liquid state is long, and crystallization does not take place even when the cooling rate is relatively slow. Thus, it is possible to cool it to the glass transition temperature maintaining the supercooled liquid state, resulting in solidification in a state of amorphous solid (glass).

On the other hand, the stability of supercooled liquid state is very low in the case of the conventional amorphous alloy. Thus, the time to be able to stay at a supercooled liquid state, without solidification, is very short at the temperature lower than the melting point. Unless it is very rapidly cooled from the molten state to the temperature lower than the glass transition temperature, a crystalline phase is caused during solidification. For the conventional amorphous alloy, an amorphous solid can be obtained only as a ribbon-like, linear, or powdery form.

The empirical rules are reported for the composition of a stable supercooled liquid (Development Background of Glass Alloys and Alloy Systems: Functional Materials, Vol. 22, No. 6, pp. 5-9 (2002)), and they are as follows: (1) It is a multi-component system with not less than three components; (2) The atomic sizes of the main three components are different to each other not less than 12%; and (3) The heat of mixing for the main three components has a negative value to each other.

As metallic glasses, Ln-Al-TM, Mg-Ln-TM, and Zr—Al-TM (here, Ln is a rare earth element and TM is a transition metal) systems were found from 1988 to 1991. Since then numerous compositions have been reported.

For example, in Japanese Unexamined Patent Publication H3-158446, $X_aM_bAl_c$ (X: Zr, Hf; M: Ni, Cu, Fe, Co, Mn; $25 \leq a \leq 85, 5 \leq b \leq 70, 0 \leq c \leq 35$) is described as an amorphous alloy with a wide supercooled liquid temperature range and excellent processability.

It is reported, in Japanese Unexamined Patent Publication H09-279318, that a metallic glass containing Pd and Pt as the essential elements is suitable as an electrode material for the electrolysis of an aqueous solution such as sodium chloride solution.

In the specification of U.S. Pat. No. 5,429,725, $Ni_{72}$—$Co_{(8-x)}$—$Mo_x$—$Z_{20}$ (x=0, 2, 4 or 6 atomic %, Z=metalloid element) is described as a metallic glass material suitable as an electrode material for the electrolysis of water.

In addition to Pd, metals such as Nb, V, Ti, Ta, and Zr are known to have hydrogen permeation properties. Metallic glasses containing these metals as a main component can exhibit hydrogen selective permeability. The examples include Nb—Ni—Zr system, Nb—Ni—Zr—Al system, Nb—Ni—Ti—Zr system, Nb—Ni—Ti—Zr—Co system, Nb—Ni—Ti—Zr—Co—Cu system, Nb—Co—Zr system, Ni—V—(Zr, Ti) system, Co—V—Zr system, and Cu—Zr—Ti system, which are described in Japanese Unexamined Patent Publication 2004-42017.

Metallic glasses used in the present invention can be suitably selected according to the objective. However, a metallic glass with $\Delta Tx$, which is the supercooled liquid temperature range expressed with the equation $\Delta Tx=Tx-Tg$ (Tx: crystallization starting temperature, Tg: glass transition temperature), being equal to or more than 30° C. is preferably used. If $\Delta Tx$ is less than 30° C., undesirable effects will be caused to the denseness of the metallic glass layer and to the formation of the amorphous phase.

Such metallic glasses include metal-metalloid (semimetal) metallic glass alloys, metal-metal metallic glass alloys, and hard magnetic metallic glass alloys.

Metal-metalloid metallic glass alloys are known to have $\Delta Tx$ equal to or more than 35° C. Depending upon the composition, they are known to have a large $\Delta Tx$, which is equal to or more than 50° C. In the present invention, a metallic glass with $\Delta Tx$ equal to or more than 40° C. is more preferable.

Metal-metalloid (semimetal) metallic glass alloys containing Fe as a metal element include, for example, alloys containing one or more than one element from the group of Al, Ga, In, and Sn as metal element in addition to Fe and one or more than one element from the group of P, C, B, Ge, and Si as semimetal element (metalloid element).

Examples of metal-metal metallic glass alloys include metallic glass alloys containing one or more than one element from the group of Fe, Co, and Ni as the main element, and one or more than one element from the group of Zr, Nb, Ta, Hf, Mo, Ti, and V, as well as B.

In the present invention, it is desirable that a metallic glass consists of a plurality of elements and that at least one element from the group of Fe, Co, Ni, Ti, Zr, Mg, Cu, and Pd is contained, as its main component, in the range of 30-80 atomic %. In addition, at least one metal element from the VIa group element (Cr, Mo, and W), in the range of 10-40 atomic %, and at least one metal element from the IVb group element (C, Si, Ge, and Sn), in the range of 1-10 atomic %, may be included. In addition, elements such as Ca, B, Al, Nb, N, Hf, Ta, and P may be added within the range of 10 atomic % to the iron group element depending upon the purpose. Under these conditions, high glass-forming capability can be achieved.

The corrosion resistance drastically increases by including at least Fe as a component element of the metallic glass. It is preferable that the Fe content in a metallic glass is 30-80 atomic %. If the Fe content is lower than 30 atomic %, the corrosion resistance cannot be achieved sufficiently. If the Fe content is higher than 80 atomic %, it is difficult to form a metallic glass. The more preferable Fe content is 35-60 atomic %. The above composition of metallic glass contributes to the formation of a stable metallic glass layer of an amorphous phase as well as to the lowering of the processing temperature. Thus, a metallic glass layer of homogeneous composition and constitution can be formed.

2. Metallic Glass Laminate

In the metallic glass laminates of the present invention, a metallic glass layer of amorphous phase was formed on the substrate surface, and there is no continuous pore (pinhole) that passes through the metallic glass layer. With such a dense amorphous metallic glass layer, functions such as excellent corrosion resistance and excellent wear resistance can be achieved. The thickness of the metallic glass layer is equal to or more than 1 µm, preferably equal to or more than 10 µm, and more preferably equal to or more than 100 µm. The upper limit of the thickness is not restricted and determined according to the purpose. However, about 1 mm is normally sufficient for the corrosion resistance and wear resistance of the substrate.

In the present invention, it is suitable that a metallic glass layer is formed on the substrate surface by the solidification and lamination of at least part of the metallic glass particle in the supercooled liquid state.

As the coating method of metal, there are compression bonding, plating, and vapor deposition. As the metallic glass lamination method of the present invention, thermal spraying is especially suitable. Thermal spraying excels in the control of deposition in the supercooled liquid state.

The supercooled liquid state is generally a state in which a melt does not solidify even below the melting point. In the normal thermal spraying, thermal spray particles are ejected from the nozzle of a thermal spray gun and heated once above the melting point to a molten state. In the present invention, metallic glass thermal spray particles hit the substrate during the flight, and they are deformed, deposited, and cooled. Thus, the metallic glass solidifies through the supercooled liquid state, in which a molten state is maintained even in the temperature range below the melting point. During the process, the metallic glass goes through the above-mentioned crystallization temperature region and through the crystallization starting temperature. The wider the supercooled liquid temperature range $\Delta Tx$, the more stable the supercooled liquid state; thus, it is difficult for crystallization to take place. If the metallic glass is heated to the temperature range that is below the crystallization starting temperature, it safely solidifies to an amorphous state without a large influence of the cooling rate.

As seen in the above-described DSC measurement, a metallic glass of an amorphous phase can have a supercooled liquid state even during heating.

The supercooled liquid state has insensitivity to conditions such as the temperature change, pressure, and flow during the deposition. Thus, a metallic glass layer of an amorphous phase (this can be confirmed with a halo pattern of X-ray diffraction) can be obtained, without the effect of the cooling rate for solidification, under a wide range of conditions.

In the supercooled liquid state, the viscosity of the metallic glass is low and it shows viscous flow. Therefore, when a metallic glass in the supercooled liquid state hits the substrate surface, it instantly collapses and spreads thin over the substrate surface; thus, a very thin excellent splat can be formed. A dense film with very small number of pores can be formed by the accumulation of these splats.

In addition, because the splats are cooled in the supercooled liquid state, only an amorphous phase is obtained without the formation of a crystalline phase.

Generally, in the case of thermal spraying in the atmosphere, oxide of thermal spray material is incorporated in the coating. Thus, undesirable effects are exerted to the properties of the coating. If the thermal spray material is allowed to hit in the supercooled liquid state, there is hardly any effect of oxidation even if thermal spraying is conducted in the atmosphere.

According to the method of the present invention, a dense coating, with almost no pores, of a homogeneous amorphous metallic glass can be obtained by thermal spraying. Thus, the method of the present invention is very useful for the surface improvement (wear resistance, heat resistance, corrosion resistance, etc.) of the substrate, functionalization of cladding materials, and the preparation of functionally graded materials.

Thus, in the present invention, it is preferable that at least part of the metallic glass particle is allowed to hit the substrate surface in the supercooled liquid state. If the surface of metallic glass particle is in a molten state, there are fewer pores in the metallic glass layer. In the case of a rapid heating process like thermal spraying, there are cases that only the surface of thermal spray particles is in a molten state or in the supercooled liquid state.

Thus, in the present invention, a metallic glass layer can be formed on the substrate surface by the solidification and lamination of at least part of metallic glass particles in a molten state or supercooled liquid state and laminated on the substrate surface.

When thermal spray particles change to a molten state, however, special attention is necessary because a crystalline phase tends to be incorporated into the metallic glass layer. If the degree of crystallization of the metallic glass layer is about 20%, there is less effect to the properties such as corrosion resistance and wear resistance. Nevertheless, the degree of crystallization should preferably be equal to or less than 10%. The degree of crystallization can be determined with DSC by measuring the area of the exothermic peak of the crystallization initiation temperature (Tx). Even if a crystalline phase is partially incorporated in the metallic glass layer of an amorphous phase, total crystallization will not take place with time unlike the case of the conventional amorphous metal.

The thermal sprayed coating reflects the morphology of the splat when the metallic glass particle hits the substrate surface (shape of the thermal spray particle on the substrate surface after the hit).

When a cross section and surfaces (substrate side or non-substrate side) of the metallic glass layer were observed with an electron microscope, the lamination of thinly collapsed splats of circular to oval shapes were observed in the metallic glass layer. It is considered that this is caused because the metallic glass particle hits on the substrate surface in the supercooled liquid state.

The lamination of the splat, in which there is a core that is thinly collapsed in a circular to oval shape at the center and there are thinly spread splashy sections around the core, was sometimes observed. This is probably caused because the metallic glass particle, of which the surface was in a molten state and the central section was in the supercooled liquid state, hit the substrate surface.

Generally, a thicker coating (equal to or more than 100 μm) can be obtained by thermal spraying than plating or vapor deposition. Therefore, thermal spraying is applied in order to impart corrosion resistance, wear resistance, heat resistance, and various other functionalities. However, the thermal sprayed coating of metal has numerous pores. As a result, the thermal sprayed coating of metal can be mainly used only for the formation of a sacrificial anode type coating, and the use in severe corrosive environments such as chemical plants has been difficult.

On the other hand, the thermal sprayed coating of the present invention is extremely dense, and it also solves the problem in the conventional thermal spraying.

For example, in Japanese Unexamined Patent Publication S61-217568, a formation method, according to the plasma spraying, of an amorphous metal product in an inert gas is disclosed. In Japanese Unexamined Patent Publication H05-195107, a formation method, according to the plasma spraying, of carbides and nitrides of transition metals on a substrate is disclosed. According to this method, an amorphous metal with high tensile strength can be formed. However, the productivity is unstable because the amorphous metal is formed by rapid cooling on the surface of the substrate. If it is slow cooled, there is a problem of crystallization. If the purpose of the product is an application to sliding parts of an automobile, there is a problem in reliability.

In Japanese Unexamined Patent Publication S63-4031, a method, in which the raw material is made amorphous by mechanical alloying, and then the obtained material was extruded while hot to maintain an amorphous state, is disclosed. However, even by this method, crystallization is unavoidable during the slow cooling of hot extrusion.

On the other hand, in Japanese Unexamined Patent Publication H08-176783, a deposition method, wherein amorphous powder raw material containing at least one element from the group of iron, nickel, and cobalt was prepared by mechanical alloying, and the obtained material was thermal sprayed, is disclosed. Although a big improvement is expected, this is also the formation of an amorphous layer by thermal spraying through rapid cooling on the substrate surface. Thus, the formation of a dense film and the bonding at the interface is not satisfactory.

Otsubo et al. (Japan Thermal Spraying Society, 2003 National Conference (fall), pp. 37-38) has disclosed the amorphous thermal sprayed coating using Fe—Cr—Mo—(C, B, P) alloy. However, the purpose was not the bonding with the substrate, and nothing is disclosed concerning the substrate and the formation conditions of a dense amorphous phase thermal spray coating.

In the present invention, the metallic glass particle of amorphous phase is used as a raw material.

The shape of the metallic glass particle is not limited in particular, and they include plates, chips, particles, and powder. Preferably they are particles or powder. As for the preparation method of metallic glass particles, there are atomization, chemical alloying, and mechanical alloying. If the productivity is considered, the preparation by atomization is preferable.

The maximum particle size of metallic glass particles is preferably equal to or less than 80 μm, and more preferably equal to or less than 50 μm. The average particle size of metallic glass particle is preferably 0.1-10 μm. The finer the particle size, the more homogeneous the coating. However, properties such as powder fluidity are poor in supplying fine metallic glass particles to the thermal spray nozzle, resulting in poor workability and productivity. If the particle size is too big, the lamination may become difficult, or a high-grade thermal sprayed coating may not be obtained.

If a metallic glass with the supercooled liquid temperature range $\Delta Tx$ equal to or more than 30° C. is used, a dense metallic glass layer, without pinholes, of an amorphous phase can be formed. The porosity of the formed metallic glass layer can be equal to or less than 2%. If the porosity exceeds 2%, an undesirable effect will be caused to properties including corrosion resistance. The maximum rate of pore area can be adopted as the porosity by analyzing an arbitrary cross sectional image of the metallic glass layer.

The density of the metallic glass layer of the present invention is 80-100% of the true density of the metallic glass.

In the present invention, the temperature load on the substrate equal to or more than 100° C. is normally necessary in order to obtain a high-grade bonding interface. The temperature load is preferably equal to or more than 200° C., and more preferably equal to or more than 250° C. The upper limit of the temperature load is not restricted; however, it is normally equal to or less than the glass transition temperature.

Examples of substrates are general-purpose metals such as iron, aluminum, and stainless steel, ceramic, glass, and some heat-resistant plastics such as polyimides. In particular, metallic materials such as copper and stainless steel, which have high heat resistance, high heat capacity, and high thermal conductivity, are preferable. Light metals such as aluminum, magnesium, and their alloys, the specific gravity of which is equal to or less than 3.0, can also be used.

In addition, the substrate is normally used after surface roughening treatment by a publicly known method such as blasting treatment in order to increase bonding with the metallic glass layer.

Thermal spraying is a coating method in which a linear, rod-like, or powdery thermal spray material is heated with a combustion flame or electrical energy, and the thermal spray particles are sprayed on the substrate surface. There are atmospheric plasma spraying, vacuum plasma spraying, flame thermal spraying, high-velocity oxygen-fuel thermal spraying (HVOF), arc thermal spraying, and cold spraying. For example, in the high-velocity oxygen-fuel thermal spraying, a thermal spray powder material is introduced into gas flame to be heated and accelerated.

In the present invention, high-velocity oxygen-fuel thermal spraying is especially superior in order to obtain a high-density amorphous phase coating.

The cold spraying is applicable for a metallic glass alloy with a relatively low supercooled liquid temperature range.

FIG. 1 is a schematic view of one example of high-velocity oxygen-fuel thermal spraying (HVOF) systems. As shown in the figure, the HVOF system is equipped with a thermal spray gun 10, fuel and oxygen are supplied from the base (left side in the figure) of the thermal spray gun 10 through the fuel pipe 12 and the oxygen pipe 14, respectively, and a high-velocity combustion flame (gas flame) 16 is formed at the flame edge (right side in the figure) of the thermal spray gun 10. A supply pipe 18 of the thermal spray material is equipped near the flame edge of the thermal spray gun 10, and thermal spray powder material is pressure fed from the pipe 18 with a carrier gas (e.g. $N_2$ gas).

Thermal spray powder particles supplied through the pipe 18 are heated and accelerated in the gas flame 16. The heated particles (thermal spray particles) 20 hit the surface of the substrate 22 at a high velocity, and they are cooled on the substrate surface and solidified to form flat splats. The thermal sprayed coating 24 is formed by the accumulation of these splats.

Kerosene, acetylene, hydrogen, propane, propylene, or the like can be used as a fuel.

The present invention is basically for the tight lamination of a dense film on the substrate; however, laminates with various patterns can also be produced.

For example, if the substrate surface is masked and a metallic glass layer is formed only on the non-masked region, it is possible to form a patterned metallic glass layer on the substrate surface.

In addition, it is possible to form a concavo-convex pattern on the substrate surface and to form a metallic glass layer on the surface.

As described below, it is also possible to transfer a concavo-convex pattern or mirror surface on a metallic glass layer surface by pressing after the metallic glass layer is formed on the substrate surface.

Thus, the metallic glass laminates with various shapes and patterns can be obtained by adjusting thermal spray conditions or by applying masks and other processes.

The laminates of the present invention can be used for various applications. For example, the application to a large-area electrode pattern, which needs corrosion resistance, is possible.

In addition, it is possible to change the bonding strength of the laminate and the properties as cladding material by forming, in advance, a convexo-concave on the substrate surface pattern.

In addition, a metallic glass bulk of an amorphous phase can be obtained by removing the substrate from the metallic glass laminate of the present invention.

The substrate can be removed by publicly known methods such as dissolution or cutting. If the adhesion between the substrate and the metallic glass layer is hindered in advance, the substrate can be easily detached from the laminate. For example, if the substrate surface is made flat and smooth like a mirror surface, the substrate can be easily detached by a slight impact on the laminate. The substrate can also be detached utilizing a difference in the linear expansion coefficient between substrate and metallic glass. If a metallic glass bulk is produced using a substrate that has a predefined concavo-convex pattern on the surface, the concavo-convex pattern can be transferred with good dimensional accuracy. Thus, it is possible to use as a die. A concavo-convex pattern or mirror surface can also be transferred on the metallic glass bulk by pressing.

In the present invention, it is possible to form a thick amorphous metallic glass layer with a large area; thus, a metallic glass layer of desired thickness and size can be formed. Accordingly, metallic glass laminates and metallic glass bulks with various shapes and complicated shapes can be easily obtained.

The metallic glass laminates and metallic glass bulks obtained in the present invention can be used in various applications such as sliding parts for automobiles, electrodes, and electronic equipment housings. The application to thermoelectric material, hydrogen storage material, and hydrogen separation membrane can also be considered as special applications.

An iron based metallic glass with excellent corrosion resistance is suitable for use in fuel cell separators. The following applications are possible in the field of the separators: the formation of a metallic glass layer on the surface of a light material (e.g. aluminum) separator (for corrosion prevention, reduction of weight), the formation of a metallic glass layer on the flow passage pattern of a base material (for corrosion prevention), and the formation of female type flow passage pattern against the male type flow passage pattern.

In the case of a laminate with Zr-based metallic glass, the metallic glass absorbs hydrogen under a hydrogen atmosphere, leading to a change in electrical properties. In addition, the laminate has properties to separate hydrogen. Thus, the laminate is suitable for a hydrogen sensor or for a hydrogen separation membrane. In particular, a thermal-sprayed porous metal tube can be suitably applied to a membrane reactor for hydrogen separation.

3. Die-Cast Article of Metallic Glass Laminate

The metallic glass is excellent in hardness, strength, heat resistance, and corrosion resistance including resistance against erosion and corrosion, compared with the conventional amorphous alloy. In addition, the processability of the metallic glass is also excellent because the flow stress markedly decreases in the supercooled liquid temperature range; thus, it becomes a viscous flow material.

Accordingly, it is conceivable to form metallic glass bulk material first and then shape this in the supercooled liquid temperature range. However, by the conventional method, cooling takes time and the cooling rate becomes slow if the size of the bulk material is large. As a result, it is difficult to obtain a large bulk material without crystallization.

On the other hand, if a metallic glass can be laminated on any size of a substrate and any desired pattern can be easily molded on the surface of the metallic glass layer, the functionality of metallic glass can be provided to the substrate regardless of the size of the substrate. In addition, if a light material and general-purpose material are used as a substrate for the laminate, the reduction of weight and the reduction of material cost can be achieved.

As a coating method of the substrate surface with a metallic glass, a physical vapor deposition method such as sputtering is generally used.

However, only a thin film of the metallic glass can be formed by this method, and a sufficient film thickness necessary for the later processing cannot be achieved. In addition, it is difficult to achieve a large area coating.

In the case of a wet system such as plating, the deposition conditions are delicate, and it is difficult to achieve a stable composition.

A method is described in Japanese Unexamined Patent Publication H11-33746, in which a metallic glass plate (thickness: 1 mm) is superimposed on another metal plate, and then they are bonded by pressing in the supercooled liquid state. In order to strongly bond them by this method, the formation of new surfaces is necessary. Thus, the deformation of both plate materials is unavoidable. In addition, as described above, it is difficult to obtain a very large bulk material of metallic glass without crystallization; thus, the conventional method is not suitable for the large-area use.

The present invention provides a die-forming article which is a laminate of metallic glass on a substrate surface and has precise convexo-concaves and mirror surface on the metallic glass surface, and a simple production method thereof.

The present inventors have found that the laminate obtained by thermal spraying of the metallic glass powder on the substrate surface was a laminate in which a thick metallic glass layer of an amorphous phase was firmly laminated on the substrate. The present inventors have also found that a pattern of a die could be nicely transferred on the metallic glass surface of the laminate by pressing the metallic glass layer surface with a die in the supercooled liquid temperature range.

Thus, a die-forming article in the present invention is characterized in that a metallic glass layer is laminated on the substrate surface, and a concavo-convex pattern and/or mirror-like smooth surface are formed on the surface of the metallic glass layer.

The above-mentioned metallic glass laminate can be suitably used for such a die-forming article.

In the die-forming article of the present invention, the thickness of the metallic glass layer at the thin section is preferably equal to or more than 0.1 mm.

In addition, in the die-forming article of the present invention, it is preferable that the metallic glass contains 30-80 atomic % of Fe atom.

In addition, in the die-forming article of the present invention, the specific gravity of the substrate can be equal to or less than 3.0.

The production method of the die-forming article in the present invention comprises:

a step in which a metallic glass layer is laminated on the substrate surface; and a step in which the pattern of a die is transferred to the metallic glass layer surface by pressing, with a die, the surface of the above-mentioned metallic glass layer in the supercooled liquid temperature range.

In the method of the present invention, it is preferable that a metallic glass layer is laminated on the substrate surface by the high-velocity oxygen-fuel thermal spraying of metallic glass particles.

In addition, in the method of the present invention, it is preferable that the thickness of the metallic glass layer is equal to or more than 0.1 mm at the lamination step of the metallic glass on the substrate surface.

In addition, in the method of the present invention, it is preferable that the thickness of the metallic glass layer, after the transfer of a pattern, is equal to or more than 0.1 mm at the thin section.

Figure 2:
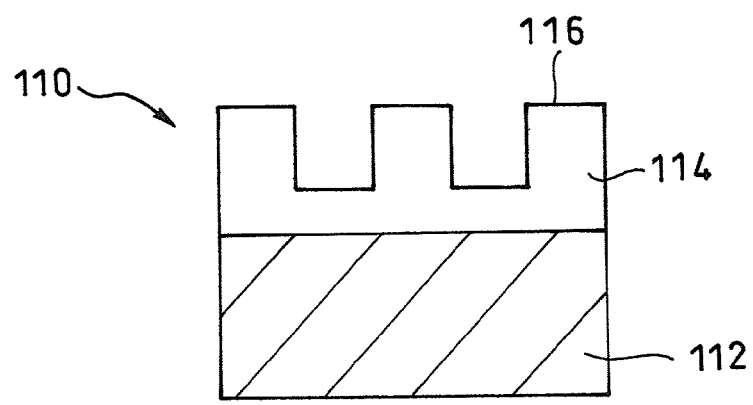
FIG. 2 is a cross-sectional view of a cast article in one example of the present invention.

In FIG. 2, a cast article 110 with a concavo-convex pattern on the surface is shown as one example of the die-forming article in the present invention (hereinafter it may be referred only as "cast article").

In the cast article 110 in FIG. 2, a metallic glass layer 114 is laminated on the surface of the substrate 112, and a concavo-convex pattern 116 is formed on the surface of the metallic glass layer 114.

Figure 3:
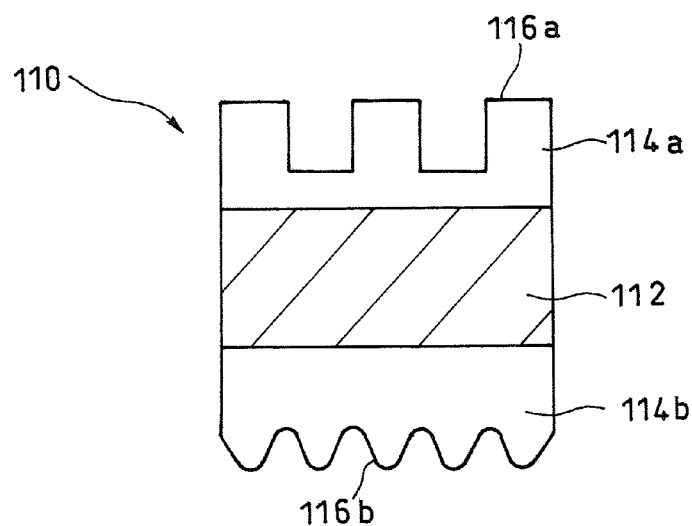
FIG. 3 is a cross-sectional view of a cast article in one example of the present invention.

In the die-forming article in the present invention, as shown FIG. 3, metallic glass layers 114a and 114b having predetermined concavo-convex patterns 116a and 116b, respectively, may be formed on both surfaces of the substrate 112.

In the cast article of the present invention, a metallic glass layer can be laminated on part of or the entire substrate surface. The pattern formed on the surface can be selected at will for each surface.

Metallic glass has a wide supercooled liquid temperature range and has very low viscosity in the supercooled liquid state. Therefore, by pressing the metallic glass with a die in such a temperature range, a precise concavo-convex pattern can be nicely transferred on the surface.

In the present invention, a laminate is prepared by forming a metallic glass layer on the substrate surface, and then the pattern of a die is transferred to the metallic glass layer to obtain a cast article. This is achieved by pressing the surface of the metallic glass layer with a die in the supercooled liquid temperature range.

Figure 4:
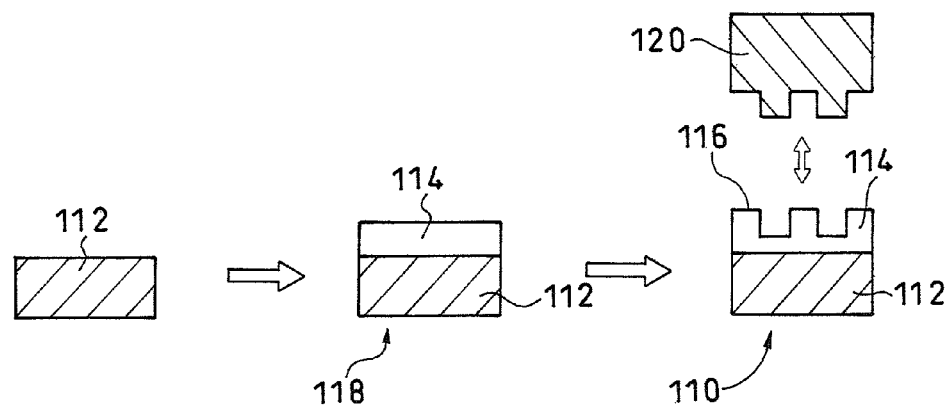
FIG. 4 is a schematic view of the production method for a cast article in one example of the present invention.

For example, as shown in FIG. 4, the cast article 110 in FIG. 2 can be obtained by the following steps:

(i) a step in which the metallic glass layer 114 is formed on the surface of the substrate 112 to prepare the laminate 118; and (ii) a step in which the intended concavo-convex pattern 116 is formed on the surface of the metallic glass layer 114 by pressing, with the die 120 of a predetermined pattern, the surface of the metallic glass layer 114 of the laminate 118 in the supercooled liquid state and transferring the pattern of the die 120 to the metallic glass layer 114.

Figure 5:
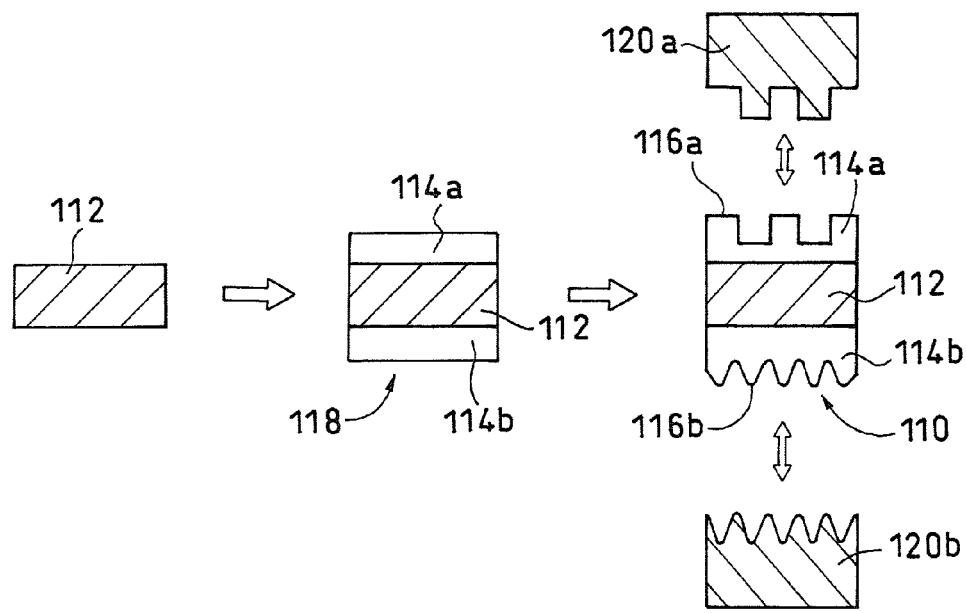
FIG. 5 is a schematic view of the production method for a cast article in one example of the present invention.

As shown in FIG. 5, the cast article 110 in FIG. 3 can also be obtained by the following steps:

(i) a step in which metallic glass layers 114a and 114b are formed on both surfaces of the substrate 112, respectively, to prepare the laminate 118; and (ii) a step in which intended concavo-convex patterns 116a and 116b are formed on the surfaces of the metallic glass layers 114a and 114b, respectively, by pressing, with the dies 120a and 120b of predetermined patterns, both surfaces of the metallic glass layers 114a and 114b of the laminate 118 in the supercooled liquid state and transferring the patterns of the dies 120a and 120b to the metallic glass layers 114a and 114b, respectively.

A method like this can similarly be applied to the case in which a metallic glass layer is laminated on the entire surface of the substrate, and a desired pattern can be formed on the surface of the metallic glass layer by transferring the pattern by using a suitable die.

If a die having a highly smooth surface is used for the transfer of a pattern, a mirror surface can be prepared. A die having both a concavo-convex pattern and smooth surface can also be used.

The film thickness of the metallic glass layer for the die-forming article in the present invention is preferably equal to or more than 0.1 mm at the thin section from the standpoint of properties such as corrosion resistance.

Publicly known methods can be used for pressing; however, in the present invention, it is necessary to heat the metallic glass layer to be pressed to the supercooled liquid temperature range to attain the supercooled liquid state. By supplying heat to the metallic glass layer (or laminate), the metallic glass layer can be brought to the supercooled liquid state. Alternatively, heat can be supplied to the metallic glass layer from the die, or both methods can be combined.

In the present invention, other publicly known steps such as heat treatment and press treatment can be incorporated, as needed, so far as there is no problem.

In the die-forming article of the present invention, a metallic glass with the supercooled liquid temperature range $\Delta Tx$ equal to or more than 30° C. can be suitably used. Here, $\Delta Tx$ is expressed with the following equation, $\Delta Tx = Tx - Tg$ (Tx: crystallization starting temperature, Tg: glass transition temperature)

The larger the $\Delta Tx$, the more stable the supercooled liquid state, and the control in the lamination and pattern transfer becomes easy. Therefore, in the present invention, $\Delta Tx$ of the metallic glass is preferably equal to or more than 30° C., and more preferably equal to or more than 40° C.

In the following, the lamination with a metallic glass layer will be explained.

In the lamination of the substrate surface with a metallic glass layer, it is necessary to achieve a sufficient thickness so that a desired concavo-convex pattern and mirror surface can be formed at the pattern transfer by pressing. The thickness of the metallic glass layer (thickness of the metallic glass layer before pattern transfer) of the laminate can be decided depending upon the width, depth, and density of the transfer pattern and the purpose. For example, when the desired thickness at the thin section of the metallic glass layer is equal to or more than 0.1 mm, the thickness should be at least 0.1 mm, and preferably it should be equal to or more than 1 mm. The upper limit of the thickness for the metallic glass layer of the laminate is not restricted. However, if the metallic glass layer is too thick, it is not economical, and it is normally equal to or less than 5 mm.

In the cast article of the present invention, if the metallic glass layer contains too many pores and crystalline phases, excellent properties of the metallic glass will be undermined. Accordingly, when a metallic glass layer is laminated on the substrate, it is desirable to obtain a laminate of a dense homogeneous amorphous phase. In addition, it is important that the metallic glass layer and the substrate are strongly bonded in lamination.

As the laminate like this, the above-mentioned metallic glass laminate is suitably used, and the thermal spraying is suitably used as the lamination method of a metallic glass layer on the substrate. In thermal spraying, it is desirable to firmly form, on the substrate, a thermal sprayed coating of metallic glass of a homogeneous amorphous phase by allowing at least part of metallic glass particles to hit the substrate surface in the supercooled liquid state. In order to increase the bonding strength, a surface roughening treatment is normally conducted on the substrate surface.

According to this method, a dense amorphous coating of metallic glass can be formed by thermal spraying of metallic glass on the surface of materials such as metal, alloy, ceramics, and resin. In particular, metallic materials such as copper and stainless steel, which have high heat resistance, heat capacity, and thermal conductivity, can be suitably coated by thermal spraying.

In addition, materials with small specific gravities, for example, aluminum, magnesium, and their alloys, which have a specific gravity that is equal to or less than 3.0, can also be used.

In the present invention, the size and shape of the substrate are arbitrary, and there is no limitation. In the lamination by thermal spraying, there is no deformation of the substrate, which is present in bonding by rolling. Therefore, the shape of the substrate can be maintained, as it is, in the die-forming article.

In the laminate of an aluminum substrate, the reduction of weight and the reduction of cost, which have been difficult to achieve in the past, are possible.

A thermal sprayed coating of metallic glass may be formed to a uniform film thickness; alternately, a graded film may be formed as needed.

The microscopic surface of a thermal sprayed coating is not smooth because of splat accumulation. As described above, however, a smooth surface can be easily obtained by transferring a pattern in the supercooled liquid state.

Desired sizes and shapes can be selected for the die-forming articles of the present invention, and excellent functionality can be achieved by the metallic glass layer. Thus, they are useful as functional components used in various fields. Examples include various bulk components such as bipolar plates (separators) for fuel cells, electrodes for water electrolysis and organic synthesis, and optical components such as polygon mirror and grating.

On both surfaces of a bipolar plate for the fuel cell, flow gas passage are normally carved so that hydrogen fuel and oxygen (air) flow in uniform contact with the entire surface of an ion exchange membrane. The depth of the flow passage is normally about 0.5 mm, and the width is about from 1 mm to several mm. Carbon material is normally used for the bipolar plate, and carving is normally carried out with an NC machine tool. Thus, it is very time-consuming and very expensive. In addition, the weight reduction of the fuel cell is also one of important issues.

According to the present invention, such flow passages can be easily formed by pattern transferring, and the issue of weight reduction can also be solved. For bipolar plates, good electrical conductivity, endurance to severe corrosive environments, small size variation, and suitability for high-precision processing are also requirements. The cast articles in the present invention are satisfactory in all of these issues.

Electrolysis efficiency and corrosion resistance are requirements for the electrodes used for electrolysis of various aqueous solutions including sodium chloride aqueous solution and also for the electrodes used for organic synthesis. It is reported in the above-mentioned Japanese Unexamined Patent Publication H09-279318 that a metallic glass in which Pd and Pt are essential elements is desirable as an electrode material. However, noble metals such as Pt are very expensive, and the reduction of their usage is desirable.

If the die-forming articles in the present invention are used for these electrodes, the usage of metallic glass can be reduced. In addition, the patterning of convexo-concaves on the metallic glass layer will increase the surface area, contributing to the miniaturization of electrodes.

The weight reduction of various optical components such as a polygon mirror is in demand. If metallic glass is laminated on the substrate surface and then a mirror surface and precise convexo-concave pattern are transferred to the surface by pressing as in the present invention, the reduction of weight can be achieved. Excellent strength and wear resistance of the metallic glass layer are additional advantages.

4. Composite Laminate of Porous Base Material and Metallic Glass

In the past, various gas permeable membranes have been investigated. Lately, an interest in hydrogen fuel as clean energy has become high; thus, the needs for hydrogen separation membranes are increasing in relation to the development of fuel cells.

The hydrogen separation membrane of a metal film with hydrogen selective permeability is used for the production of high purity hydrogen. The principle is that a high-pressure starting gas (gas mixture containing hydrogen) is allowed to contact one side of a hydrogen permeable metal membrane, and only hydrogen is allowed to pass through the membrane; thus, high purity hydrogen is obtained on the opposite side. The Pd-based metal membranes containing Pd or Pd alloys (e.g. Pd—Ag alloys) have high hydrogen selectivity and a fast hydrogen permeation rate. As a result, they are often used as a hydrogen separation membrane.

However, Pd is a very expensive noble metal, and an alternative product that is made of a less expensive material than Pd and Pd alloys is sought-after. As an alternative product for Pd and Pd alloys, for example, a hydrogen separation membrane made of niobium alloy foil which crystal structure is amorphous disclosed in Japanese Unexamined Patent Publication 2004-42017. Because the hydrogen separation is normally conducted in the temperature range of equal to or more than a few hundred degrees, no satisfactory material has been obtained in terms of stability.

In order to increase the hydrogen permeation performance, it is desirable to increase the hydrogen permeation rate by thinning the metal film and to increase the pressure difference between both sides of hydrogen separation membrane. However, if the metal film is thinned, the mechanical strength to withstand the pressure difference cannot be attained. Thus, attempts have been made to achieve thinning of the metal film and also to achieve the mechanical strength by forming a hydrogen permeable metal film on a porous base material.

A method of forming a hydrogen permeable metal film on a porous base material is described, for example, in Japanese Unexamined Patent Publication H05-76738. In this method, a Pd-based film, which was thinned by rolling, was bonded on the porous metallic base to prepare a hydrogen separation membrane.

However, there are numerous occasions, in the thin film by rolling, that foreign materials, which have diameters of several μm, are present between a roll and a parent material plate to be rolled. It is difficult to completely remove these foreign materials. As a result, foreign materials are trapped at the time of rolling, and defects that pass through along the direction of thickness are sometimes produced. In addition, a thin film is fragile and easily electrically charged. Thus, the handling during processing is difficult, and it often results in a low yield.

In addition, in order to prepare an alloy foil by rolling, special rolling conditions and the repetition of annealing steps are necessary. As a result, the production cost will become extremely high. If annealing is repeated during the preparation of a foil, the segregation of elements in the foil often takes place. In addition, the operation should be carried out in an inert gas atmosphere in order to prevent the oxidation of the alloy. If the rolling step and annealing step are conducted in an inert gas atmosphere, the equipment size will become very large.

In Japanese Unexamined Patent Publication H05-123548, the formation of a Pd-based film, by plating, on the surface of a porous metal is described.

In addition, in Japanese Unexamined Patent Publication H10-297906, the formation of a Pd-based film, by vapor deposition, on the surface of a porous metallic base material is described.

Although it is possible to form a film directly on the surface of the porous base material by plating or vapor deposition, it is time-consuming to completely close the pores of the porous material; thus, the productivity is poor. In addition, the thickness of the film is thin at the center of a pore. Thus, there are issues in that the resistance to pressure is not sufficient and that it is difficult to completely eliminate pinholes.

In Japanese Unexamined Patent Publication H06-91144, the formation of a Pd-based film, by vacuum plasma spraying, on the surface of a porous material is described.

Vacuum plasma spraying is conducted in a chamber of reduced pressure and in a non-oxygen atmosphere. Therefore, the oxidation of spray material does not take place, and a coating of high purity can be achieved. However, the spray coating is generally porous, and its application to a hydrogen separation membrane is difficult without any additional treatment.

The present invention solves these problems by providing a composite laminate that is made of a porous base material and a thin metal film and that is usable as a gas separation membrane. The present invention also provides its simple production method.

The present inventors have found that a dense thermal sprayed coating of metallic glass, without pinholes, of a homogeneous amorphous phase could be easily laminated on the surface of the porous base material by thermal spraying of a metallic glass on the surface of the porous base material. The present inventors have also found that if a metallic glass with selective permeability for a specific gas such as hydrogen was used, the obtained composite laminate could be satisfactorily used as a gas separation membrane even without sealing.

Thus, the composite laminate of the present invention is characterized in that a thermal sprayed coating of metallic glass without pinholes is laminated on the surface of a porous base material.

In the composite laminate of the present invention, it is preferable that the thermal sprayed coating of metallic glass has gas selective permeability, and it is more preferable that the selected gas is hydrogen.

In addition, it is preferable that the thickness of the thermal sprayed coating of metallic glass is 1-1000 μm.

In addition, it is preferable that the pore diameter of the porous base material is in the range of 0.1-1000 μm.

In addition, it is preferable that the shape of the composite laminate of the present invention is tubular.

In the gas separation membrane of the present invention, any composite laminate described above can be used.

The production method of a composite laminate in the present invention is characterized in that a thermal sprayed coating of metallic glass without pinholes is laminated on the surface of a porous base material by high-velocity oxygen-fuel thermal spraying of a metallic glass on the surface of the porous base material.

The above-mentioned metallic glass laminate can be suitably applied to this type of composite laminate.

Figure 6:
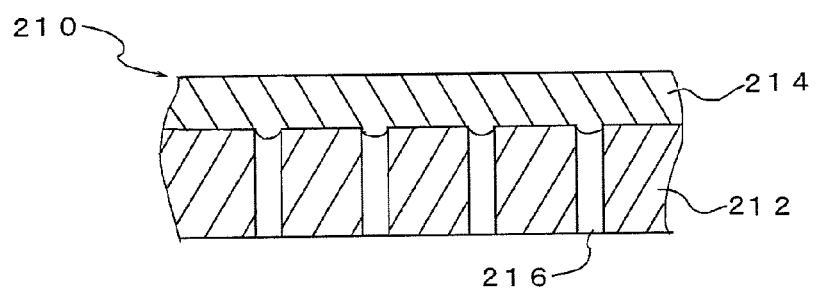
FIG. 6 is a cross-sectional view of a composite laminate in one example of the present invention.

One example of composite laminate in the present invention is shown in FIG. 6. In the composite laminate 210 in FIG. 6, a thermal sprayed coating of metallic glass 214 is laminated on one surface of the porous base material 212. The porous base material 212 has a plurality of pores 216, which pass through along the direction of thickness, and one side of openings of the pores 216 is completely closed with the thermal sprayed coating of metallic glass 214. The pores are not necessary to have a fixed shape or a fixed direction so far as the pores pass through the porous base material like porous ceramic material and nonwoven metal fabric. Sometimes, the thermal sprayed coating of metallic glass 214 goes somewhat into the openings of the pores 216 of the porous base material 212. The thermal sprayed coating of metallic glass 214 is strongly bonded to the surface of the porous base material 212.

If the thermal sprayed coating of metallic glass 214 has gas selective permeability, the composite laminate can be used as a gas separation membrane. For example, if the coating has hydrogen gas selective permeability and a gas mixture containing hydrogen (starting gas) contacts the thermal sprayed coating of metallic glass 214, only hydrogen gas passes through the thermal sprayed coating of metallic glass 214 and then through the pores 216 of the porous base material 212. High-purity hydrogen gas can be obtained by recovering this hydrogen gas.

Figure 7:
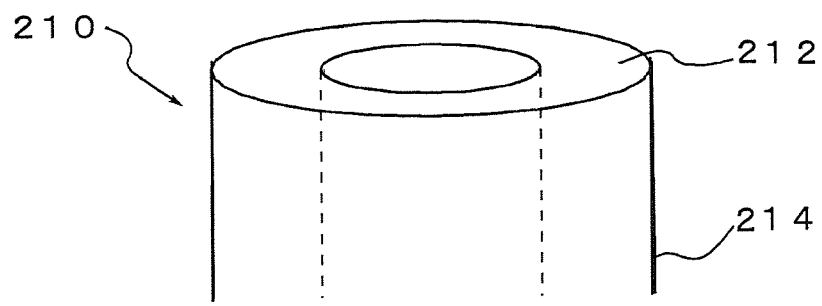
FIG. 7 is a schematic view of a tubular composite laminate in one example of the present invention.

FIG. 7 shows one example of tubular composite laminate 210. A thermal sprayed coating of metallic glass 214 with hydrogen gas selective permeability is laminated on the outer surface of the tubular porous base material 212. In this-type of composite laminate, the hollow section inside the tube functions as a flow passage of high purity hydrogen gas, which has permeated through the thermal sprayed coating of metallic glass 214 and then passed through the porous base material 212.

The separation conditions when it is used as a separation membrane can be set as appropriate. For example, the temperature and pressure of a supplied gas mixture can be set at 500° C. and 1 MPa, respectively, and the pressure of the permeation-through side can be set at 0.1 MPa.

Various materials, structures, shapes, and sizes are proposed for the porous base material 212, and they can be selected according to purpose. As a shape, for example, there are sheet-like, fibrous, plate-like, and tubular shapes. As a material, there are metals such as carbon steel, stainless steel, and aluminum, inorganic materials such as ceramics, and organic polymer materials. Metallic porous materials are often advantageous in the mechanical strength, bondability with other materials, heat resistance, and cost.

In the use of a porous metallic base material, if the hydrogen separation membrane is operated for a long period at a high temperature, the separation efficiency may decrease because of the diffusion reaction between the thermal sprayed coating and the metallic base material. In this case, a barrier layer can be installed between the porous base material 212 and the thermal sprayed coating 214 in order to suppress interdiffusion. For example, in the above-mentioned Japanese Unexamined Patent Publication H 5-76738, a ceramic barrier layer is installed with a method such as CVD.

In order to improve hydrogen permeation performance, a Pd film etc. may be additionally coated on the surface of the thermal sprayed coating 214 by a publicly known method.

The diameter of the pore 216 of the porous base material 212 may be set in the range of 0.1-1000 μm, and preferably 1-100 μm. The distance between the neighboring pores may be set in the range of 2-50 μm. The larger the pore diameter and open-area percentage of the porous base material, the better the gas permeability. In this case, however, the mechanical strength will not be sufficient as the base material. In addition, if the pore diameter is too big, the thickness of the thermal sprayed coating will become too thick in order to completely cover the pore. As a result, the rate of gas permeation may become too small.

The porous base material 212 in FIG. 6 is SUS430 with a thickness of 0.1 mm. The cross-sectional shape (shape at the opening) of the pore 216, which passes through along the direction of the thickness, is a rectangle with the major axis 50 μm and the minor axis 10 μm. The distance between the neighboring pores is 20 μm. However, they are not limited to these values.

The shape of the pore is not limited in particular, and the examples of the opening shape include circle, oval, square, line-shape, and irregular shape.

In the present invention, porous base materials different in the pore diameter, cross-sectional shape, and material kind can be superimposed, as appropriate, so that the permeability and mechanical strength will be the best. For example, a plurality of porous base materials can be superimposed so that the closer to the thermal sprayed coating the smaller the diameter of the opening.

In the next, the thermal sprayed coating of metallic glass will be explained.

In the composite laminate of the present invention, $\Delta Tx$ of the metallic glass is preferably equal to or more than 30° C., more preferably, equal to or more than 40° C.

Examples of the metallic glass are described above. Among these, metals such as Nb, V, Ti, Ta, and Zr in addition to Pd are known to have hydrogen permeation properties. The metallic glasses based on these metals can have hydrogen selective permeability. Examples include the Nb—Ni—Zr system, Nb—Ni—Zr—Al system, Nb—Ni—Ti—Zr system, Nb—Ni—Ti—Zr—Co system, Nb—Ni—Ti—Zr—Co—Cu system, Nb—Co—Zr system, Ni—V-(Zr, Ti) system, Co—V—Zr system, and Cu—Zr—Ti system, which are described in the above-mentioned Japanese Unexamined Patent Publication 2004-42017.

In the application in which gas permeability is not required, a composite laminate can be formed by using an appropriate metallic glass for the purpose. A porous base material is advantageously used as a lightweight substrate. If the porous base material is covered with a metallic glass, a light-weight material with excellent metallic glass functionality can be obtained.

The thermal sprayed coating of metallic glass 214 can be laminated by the thermal spraying of metallic glass on the surface of the porous base material 212. Specifically, in the production of the above-mentioned metallic glass laminate, a porous base material is used as a substrate.

A thermal sprayed coating of metal usually has numerous pores. Therefore, when metal is sprayed on a porous substrate by thermal spraying, it is difficult to completely close the pores of the substrate even when a thick thermal sprayed coating is formed.

In the present invention, it is possible to easily form a strong metallic glass coating of a dense and homogeneous amorphous phase on the surface of the porous base material in a short time by allowing at least part of the metallic glass particle to hit the surface of the porous base material in a molten state or supercooled liquid state.

The thermal sprayed coating and the surface of the base material can be strongly bonded. In addition, at the impact of thermal spray, some of the thermal spray particles go somewhat into the pores of the porous base material around the opening; thus, they play a role of an anchor.

The amorphous metal has little hydrogen embrittlement compared with crystalline metal, and it is excellent in corrosion resistance and strength. If a crystalline phase is contained in the metallic glass coating, such excellent properties of metallic glass will be lost. The degree of crystallization in the metallic glass layer is preferably equal to or less than 20%, and more preferably equal to or less than 10%.

The size of thermal spray particles is on the order of microns. When these particles hit the substrate surface, they thinly collapse and they can widely cover the pores of the porous base material. As a result, the pores will be completely closed in an extremely short time compared with the vapor-phase process.

In addition, in the lamination by thermal spraying, a metal film can be directly formed on the base material. Thus, the step to bond a metal foil to the base material is not necessary.

If a tubular laminate is desired, a porous tubular base material can be directly thermal sprayed. Alternatively, a sheet-like or plate-like porous base material may be thermal sprayed, and these may be formed to a tubular shape.

It is possible to obtain a thicker coating (equal to or more than 1000 µm) by thermal spraying than plating or vapor deposition. However, when the coating is used as a gas separation membrane, the thickness of the thermal sprayed coating of metallic glass is preferably 1-1000 µm, and more preferably 20-200 µm. In the thermal spraying to a porous base material, thermal spray particles enter into the pores at the time of impact. Thus, it is possible to control the thickness of the thermal sprayed coating from the outermost surface to the inside of the pore to the range of 1-1000 µm by the adjustment of substrate temperature, metallic glass kind, and thermal spray conditions.

The thermal sprayed coating of metallic glass can be formed to a uniform thickness, or it can be formed to a gradient film as needed.

5. Solder-Corrosion Resistant Member

A widely used soldering method at the assembly floor of electronics is to allow a soldering iron to contact a land and workpiece, which are on the board, to make them hot, melt solder and spread it on the joining section, then release the soldering iron tip to allow the solder to solidify. In addition, so-called "flow soldering" is also widely used. In this soldering method, a printed circuit board is passed on the solder bath containing heated molten solder and allow molten solder (normally a jet wave of molten solder is formed with a fin equipped in the bath) to contact a soldering section of the board.

For soldering, Sn—Pb alloy solders have been mainly used. In order to improve the solderability such as initial wettability and spreadability of solder, a flux is blended. This flux causes a problem that the members for soldering are corroded by a corrosive substance such as chlorine contained in the flux.

Lately, environmental pollution due to lead is also a big problem. There is a trend that Sn solders without Pb, namely, lead-free solder is being adopted instead of Sn—Pb eutectic solder. In Restriction of Hazardous Substances (ROHS) under EU Directive on Waste Electrical and Electronic Equipment (WEEE), the termination of the use of hazardous substances such as lead after July 2006 was finalized. Thus, switching to lead-free solder is an urgent task mainly in printed board assembly.

However, this lead-free solder is highly corrosive and has higher melting points and inferior wettability compared with Sn—Pb solder. In lead-free solders, the dissolution of copper and iron is fast, and dissolution damage is also reported even for other metals such as stainless steel, which has high corrosion resistance against the conventional Sn—Pb solder. Therefore, the conventional soldering components such as a solder bath and soldering iron tip cannot be used as they are.

For a soldering iron tip, a tip of copper-based material has been used considering the efficiency of heat conductivity. In order to improve the life of a tip, iron-based metallic material, chromium, or hard chrome is plated on the surface of the copper-based tip main body. However, its life in industrial usage is about 1 week; therefore, the deteriorated tip should be replaced at the factory floor. In the case of automatic soldering equipment, for example, it is necessary to carry out accurate positioning such as the determination of the central position. Thus, it is desired to decrease the frequency of the replacement operation by improving the corrosion resistance and durability of the soldering iron tip.

On the other hand, a solder bath used for dipping and feeding solder is usually made of stainless steel. However, as described above, when strongly corrosive lead-free solder is accommodated, the surface is corroded and the lifetime becomes extremely short. In particular, when lead-free solder, for example, Sn—Ag—Cu solder, which is the mainstream lead-free solder at present, is used, the difference between the usage temperature (about 250° C.) and the melting temperature (about 220° C.) is about 30° C., and it is about a half of 57° C., which is the temperature difference of the conventional Sn—Pb eutectic solder. As a result, the quality of solder tends to decrease because of the segregation of solder components. In order to suppress this type of quality deterioration, sufficient heating and stirring are necessary inside the solder bath. Thus, the erosion of the surface progress more easily, and the lifetime becomes extremely short.

In order to improve such corrosion resistance against molten solder, various corrosion resisting materials have been considered.

For example, in Japanese Unexamined Patent Publication H01-309780 and Japanese Unexamined Patent Publication H07-112272, as a soldering iron tip with excellent corrosion resistance and durability, a soldering iron tip in which a coating film of amorphous metal is formed at the tip section by sputtering, and a soldering iron tip, in which iron plating was performed on the coating film of the above amorphous metal are disclosed. In this soldering iron tip, even when the iron plating is corroded, the protection of the main body is secured by the underlayer coating film of amorphous metal. As a result, durability and corrosion resistance can be improved.

For the corrosion resistance of a solder bath, the method in which the inner surface of solder bath is made of a titanium layer by using a cladding material that has the titanium layer on the one surface and the method in which on the inner surface of a solder bath formed of stainless steel is covered with a ceramic layer are known (e.g. Japanese Unexamined Patent Publication 2002-28778). In addition, the method in which the inner surface of a solder bath is coated with a hard layer formed by nitriding is also known (Japanese Unexamined Patent Publication 2004-141914).

However, these methods had problems in that they are not effective or expensive, or in that the processing is difficult.

The present invention provides a solder-corrosion resistant member that has excellent corrosion resistance against solder especially against lead-free solder and realizes a long life.

The present inventors have diligently studied erosion resistance, high-temperature tolerance, corrosion resistance, and wear resistance against solder. As a result, the present inventors have found that amorphous metal (alloy) and especially metallic glass coating are excellent in the corrosion resistance against solder.

The solder-corrosion resistant member in the present invention is characterized in that the contact surface to molten solder or the underlayer of the contact surface to molten solder is formed of an amorphous metallic glass coating.

In the present invention, it is preferable that the diameter of the pore present in the metallic glass coating is equal to or less than the coating thickness and that the continuous pore that passes through the coating is not present.

It is also preferable that the thickness of the metallic glass coating is equal to or more than 0.01 mm.

It is also preferable that the metallic glass contains 30-80 atomic % of the Fe atom.

It is also preferable that the metallic glass coating is formed by high-velocity oxygen-fuel thermal spraying.

It is also preferable that the solder is a lead-free solder.

The solder-corrosion resistant member of the present invention can have a structure of the above-mentioned metallic glass laminate.

The soldering iron tip of the present invention is made of any of the above-mentioned solder-corrosion resistant members.

In addition, the solder bath of the present invention is made of any of the above-mentioned solder-corrosion on resistant members.

The above-mentioned metallic glass laminate can be suitably applied for this type of solder-corrosion resistant member.

Figure 8:
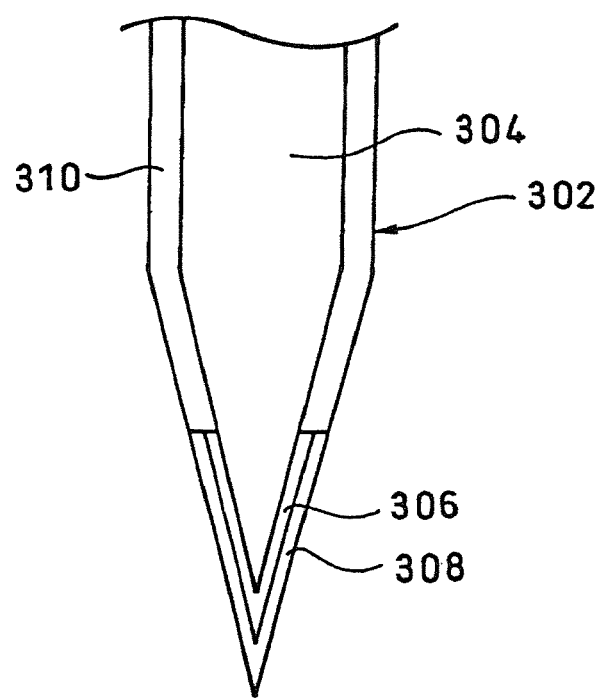
FIG. 8 is a cross-sectional view of a soldering iron tip in one example of the present invention.

A soldering iron tip is shown in FIG. 8 as one example of solder-corrosion resistant members of the present invention. As shown in FIG. 8, in the soldering iron tip 302, at the tip section of the soldering iron tip main body 304 of oxygen-free copper, an underlayer 306 of high corrosion resistant metallic glass and a surface layer 308 (for example, pure iron plating) of a metal with good solder wettability are laminated. The rest of the surface is coated with a material with low solder wettability, for example, hard chrome plating 310.

In this type of soldering iron tip 302, the tip section has the metal surface layer 308 that has good wettability with solder; thus, workability in soldering is very good. In addition, the tip section has a high corrosion-resistant metallic glass as the underlayer 306. Therefore, even when the surface layer 308 is corroded, the metallic glass underlayer 306 will not be corroded. As a result, the main body will never be corroded, and the soldering iron tip is excellent in corrosion resistance.

On the other hand, other parts than the tip section is formed of a material with poor solder wettability such as chrome plating 310; therefore, no solder climbing will take place.

The surface layer 308 is not necessary if satisfactory workability is available with only the metallic glass coating.

If the solder wettability of the metallic glass coating is low, the metallic glass underlayer 306 may be continuously installed instead of the hard chrome plating 310 on the surface of other part than the tip section. Alternatively, at other part than the tip section, a metallic glass coating layer, which is continuous from the metallic glass underlayer 306, and a coating layer of low solder wettability such as chrome plating on the surface of the metallic glass coating layer may be formed.

In order to increase the adhesion between the metallic glass underlayer 306 and the surface layer 308, a middle layer of a material with good adhesion to both layers can be formed between the two layers. An example of the material with good adhesion to both layers is normally the same kind of metal as the metal of surface layer 308 and formed by the same means as the formation of the underlayer 306, for example, by thermal spraying.

If the metallic glass coating is too thin, satisfactory corrosion resistance cannot be achieved. The thickness is preferably equal to or more than 10 μm, and more preferably equal to or more than 100 μm. On the other hand, if it is too thick, the cost will become too high; therefore, the film thickness of about 1 mm, at the maximum, is sufficient.

Figure 9:
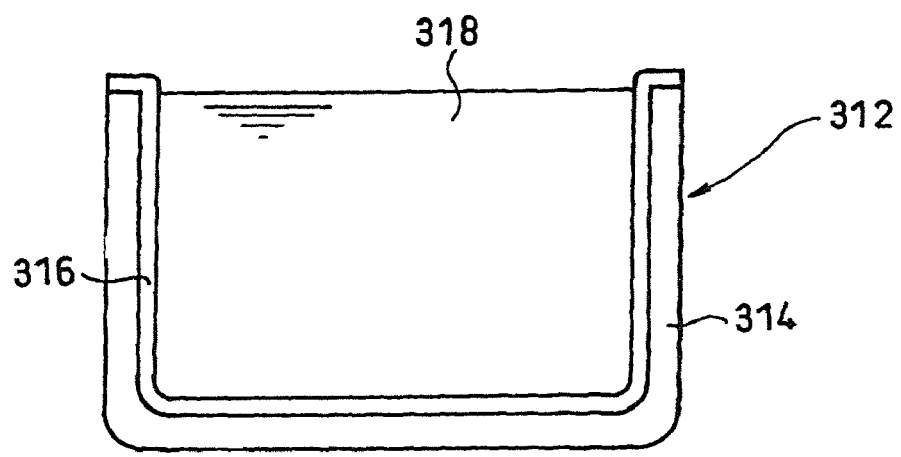
FIG. 9 is a cross-sectional view of a solder bath in one example of the present invention.

A solder bath is shown in FIG. 9 as one example of solder-corrosion resistant members of the present invention. In FIG. 9, the stainless steel 314 of the solder bath 312 is coated, at least on its surface in contact with the molten solder 318 present inside, with a metallic glass coating 316. The solder bath is box-shaped and the top is opened. When a jet nozzle, fin, heater, etc. are installed inside the solder bath 312, the molten solder contacting faces of these members can also be coated with a metallic glass coating.

If the metallic glass coating is too thin, satisfactory corrosion resistance cannot be achieved. The thickness is preferably equal to or more than 50 μm, and more preferably equal to or more than 100 μm. On the other hand, if it is too thick, the cost will become too high; therefore, the film thickness of about 1 mm, at the maximum, is sufficient.

Thus, the present invention provides safely usable solder-corrosion resistant members, which do not be corroded for a long period against highly corrosive lead-free solder, by forming a metallic glass coating, for the various members of soldering equipment, on the face in contact with molten solder.

In the present invention, it is preferable that the supercooled temperature range $\Delta Tx$ of the metallic glass is equal to or more than 30° C. A dense amorphous phase coating can be obtained by using this type of metallic glass.

The corrosion resistance can be drastically improved if at least Fe is contained in the metallic glass. It is desirable that the metallic glass contains 30-80 atomic % Fe. If the content of Fe is less than 30 atomic %, the corrosion resistance is not satisfactory. If the content of Fe exceeds 80 atomic %, the formation of metallic glass is difficult.

The preferable composition includes, for example, iron-based metallic glasses such as $Fe_{43}Cr_{16}Mo_{16}C_{15}B_{10}$ (sub-indices indicate atomic %), $Fe_{75}Mo_4 P_{12}C_4B_4Si_1$, and $Fe_{52}CO_{20}B_{20}Si_4Nb_4$.

It has been known that the metallic glass is generally more corrosion resistant and has higher mechanical strength than the normal amorphous alloy. However, it has been difficult to form a thick metallic glass film of a homogeneous amorphous phase.

In the present invention, a metallic glass coating of a homogeneous amorphous phase can be obtained by thermal spraying, in which at least part of the metallic glass particle is solidified and laminated in a molten state or supercooled state on the substrate surface.

A thick coating (equal to or more than 100 μm) can be obtained by thermal spraying compared with plating or vapor deposition. However, a thermal sprayed coating of metal normally contains many pores, and satisfactory corrosion resistance cannot be achieved. In the present invention, a dense coating with high corrosion resistance can be formed by the thermal spraying of metallic glass, as a raw material. The coating can endure the usage in severely corrosive environment such as lead-free solder bath and soldering iron for a long time.

According to this method, a metallic glass can be thermal sprayed on the surface of materials such as metal, alloy, ceramic, and resin to form a corrosion resistant coating. In particular, thermal spraying can be suitably conducted on metallic materials such as copper and stainless steel, which have high heat resistance, high heat capacity, and high thermal conductivity.

A metallic glass coating can be directly formed on the surface of various members that are in contact with molten solder, for example, on the surface of a soldering iron tip and the inner surface of a solder bath as well as fin, shaft, and heater. Alternatively, the surface of a suitable substrate can be thermal sprayed to prepare a composite material, and the composite material can be formed into a shape to prepare a member.

A metallic glass coating can be formed to a uniform film thickness or to a graded film as needed.

In the following section, the present invention will be explained by specific examples; however, the present invention is not limited by these examples. In the following test examples, HVOF system (JP5000 by Eutectic of Japan, Ltd., barrel length: 4 inches) was used for thermal spraying.

EXAMPLES

Test Example 1

Production of Metallic Glass Laminate

A thermal spraying test was conducted using gas-atomized powder of $Fe_{43}Cr_{16}Mo_{16}C_{15}B_{10}$, which is known to be an metallic glass excellent in corrosion resistance, as a thermal spray material. According to a DSC analysis, the glass transition temperature of the metallic glass powder (Tg) was 611.7° C., the crystallization initiation temperature (Tx) was 675.2° C., and ΔTx was 63.5° C. The melting point (Tm) was about 900° C. In addition, it was confirmed that the powder is be an amorphous phase by X-ray diffraction. Thermal spray conditions are as follows.

TABLE 1

| Substrate | SUS304L plate |
|---|---|
| Thermal spray feedstock | $Fe_{43}Cr_{16}Mo_{16}C_{15}B_{10}$ gas-atomized powder |
| | ΔTx: about 63° C. |
| | Particle size: minus 53 μm sieve |
| | (maximum particle diameter: 53 μm) |
| Thermal spray conditions | Powder carrier gas: $N_2$ |
| | Fuel: kerosene, 6.0 GPH |
| | Oxygen: 2000 SCFH |
| | Thermal spray distance (distance from the edge of the thermal spray gun to the surface of the substrate): 380 mm |
| | Moving velocity of thermal spray gun: 200 mm/sec |
| | Substrate surface temperature: 200° C. (heated with a hot plate) |

Figure 10:
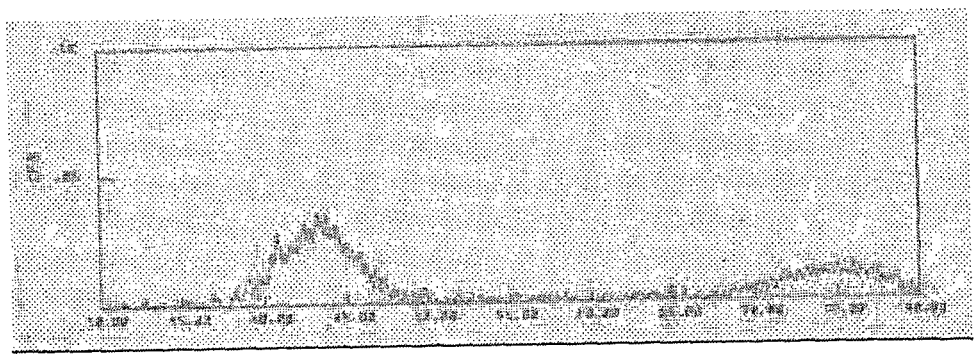
FIG. 10 is an X-ray diffraction pattern of the metallic glass laminate (Test Example 1) in one example of the present invention.

Under the condition described in Table 1, a thermal sprayed coating with a film thickness of about 1 mm was formed to obtain a laminate. A halo pattern characteristic to an amorphous phase was observed in the X-ray diffraction of the thermal sprayed coating. Thus, the coating was confirmed to be a homogeneous amorphous phase (FIG. 10).

Figure 11:
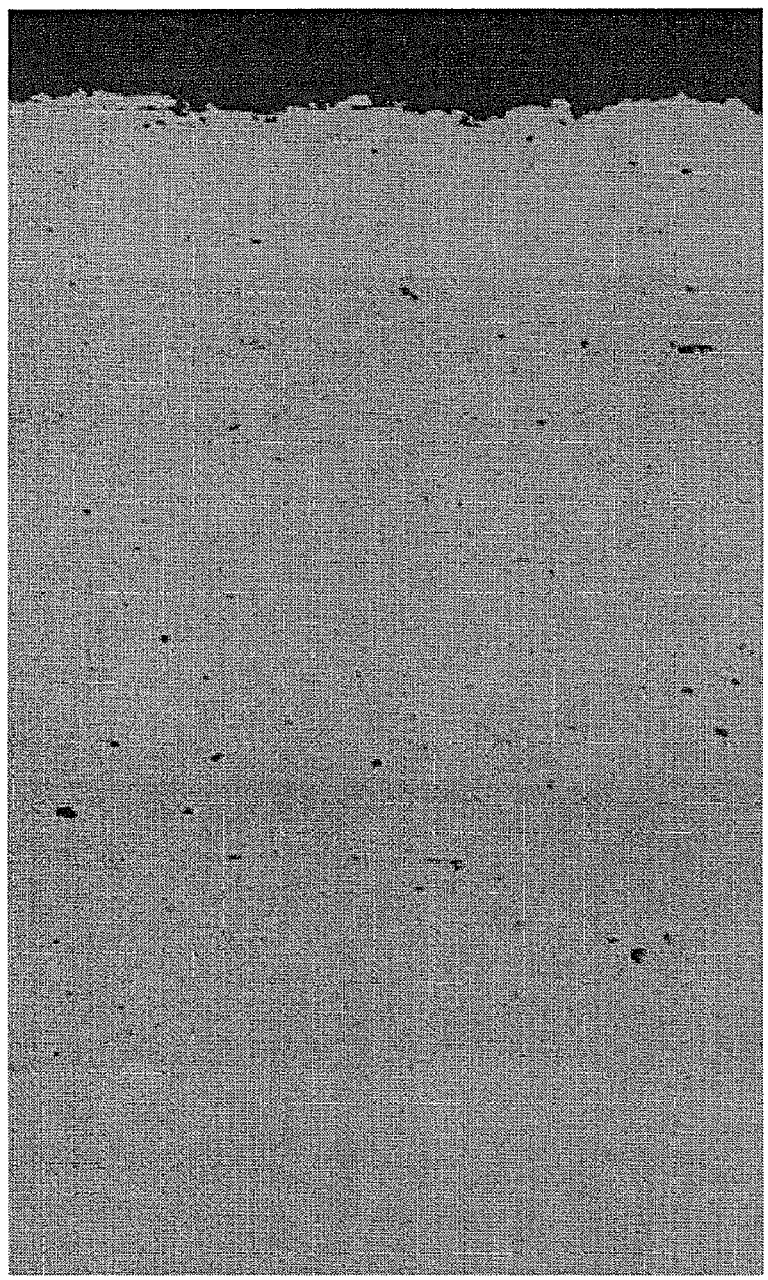
FIG. 11 is a cross-sectional picture of the metallic glass laminate (Test Example 1) in one example of the present invention.

A cross-sectional image is shown in FIG. 11. No continuous pore that passes through the thermal sprayed coating was observed in the image, and the porosity was 1.2%. As to the porosity, a two-dimensional image analysis of an arbitrary cross section (n=10) of the thermal sprayed coating was conducted, and the obtained maximum area rate of pores was adopted as the porosity.

An aqua regia dipping test (25° C., 2 hours) was conducted for the thermal sprayed coating layer of the laminate. No corrosion was observed, and the coating had very high corrosion resistance.

Test Example 2

Effect of the Porosity

As described below, the supply of fuel and oxygen was varied, and the thermal spraying was conducted in the same way as Test Example 1 to obtain a laminate (thermal sprayed coating: about 200 μm).

TABLE 2

| Test | Fuel | Oxygen | Porosity | Corrosion resistance |
|---|---|---|---|---|
| 2-1 | 6.0 GPH | 2000 SCFH | about 1% | ○ |
| 2-2 | 3.5 GPH | 1250 SCFH | about 5% | x |

As the laminate of Test Example 2-1 in Table 2, when the porosity was equal to or less than 2%, high corrosion resistance similar to that of Test Example 1 was observed. However, when the porosity exceeded 2% as the laminate of Test Example 2-2, the corrosion resistance decreased and corrosion was observed in the aqua regia test.

Test Example 3

Effect of ΔTx

Laminates were obtained by thermal spraying of amorphous metallic glass powders with different supercooled liquid temperature ranges ΔTx in the same way as Test Example 1 (thermal sprayed coating: about 200 μm). The thermal sprayed coatings were evaluated for the formation of an amorphous phase based on the criteria shown below.
(Formation of an Amorphous Phase)
  ○: A halo pattern was observed by X-ray diffraction (single amorphous phase)
  Δ: Both halo pattern and crystalline peak were observed by X-ray diffraction (partially crystalline phase)
  x: A halo pattern was not observed by X-ray diffraction (crystalline phase)

TABLE 3

| Test | Metallic glass | ΔTx | Formation of an amorphous |
|---|---|---|---|
| 3-1 | $Fe_{43}Cr_{16}Mo_{16}C_{15}B_{10}$ | about 63° C. | ○ |
| 3-2 | $Fe_{52}Co_{20}B_{20}Si_4Nb_4$ | about 31° C. | ○ |
| 3-3 | $Fe_{78}Si_{10}B_{12}$ | about 0° C. | x |

Figure 12:
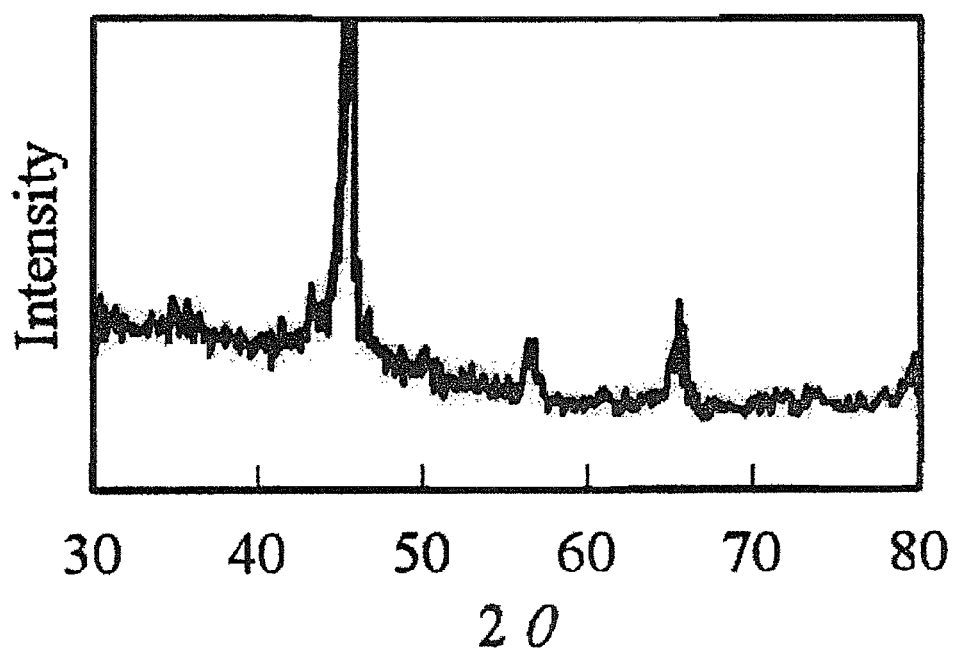
FIG. 12 is an X-ray diffraction pattern of the laminate produced from amorphous metallic glass particles with $\Delta Tx=0$ (Test Example 3-3).

As Test Examples 3-1 to 3-2 in Table 3, when a metallic glass with the supercooled liquid temperature range ΔTx equal to or more than 30° C. was used, a thermal sprayed coating of a single amorphous phase could be formed. However, if ΔTx was lower than 30° C., the formation of a crystalline phase was recognized, and it was difficult to form a thermal sprayed coating of an amorphous phase. The X-ray diffraction pattern for the thermal sprayed coating of the laminate 3-3 is shown in FIG. 12.

The formation of a crystalline phase is not desirable because an undesirable effect to corrosion resistance is caused. If ΔTx is lower than 30° C., the porosity will become high. Accordingly, a metallic glass with ΔTx equal to or more than 30° C. is preferable.

Test Example 4

Spray Particle Trapping Test (1)

In order to investigate the condition when thermal spray particles hit the surface of the substrate, a thermal spray particle trapping test was conducted. Immediately after the start of thermal spraying on the substrate surface, the supply of gas flame and thermal spray particles to the substrate surface was interrupted with an interrupting plate, and the shape of individual splats and the condition of the substrate surface before the accumulation of splats were investigated.

The feeding rates of fuel and oxygen were changed to the conditions shown in Table 4. Other conditions were the same as those for the above-mentioned Test Example 1.

TABLE 4

Figure 13:
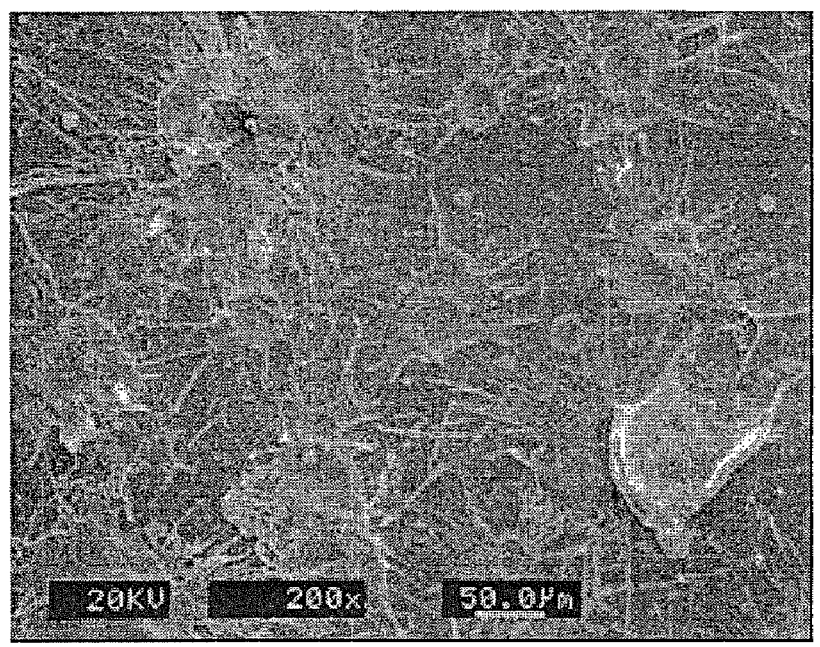
FIG. 13 is an electron micrograph of the surface of SUS304 L substrate in the thermal spray particle trapping test under the conditions of fuel 6.0 GPH and oxygen 2000 SCFH (Test 4-1).
Figure 13:
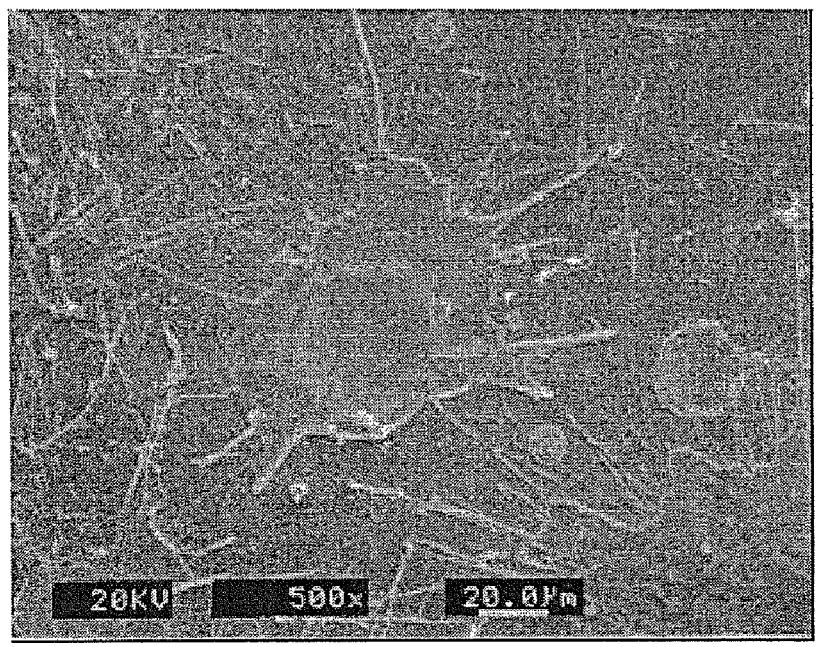
Figure 14:
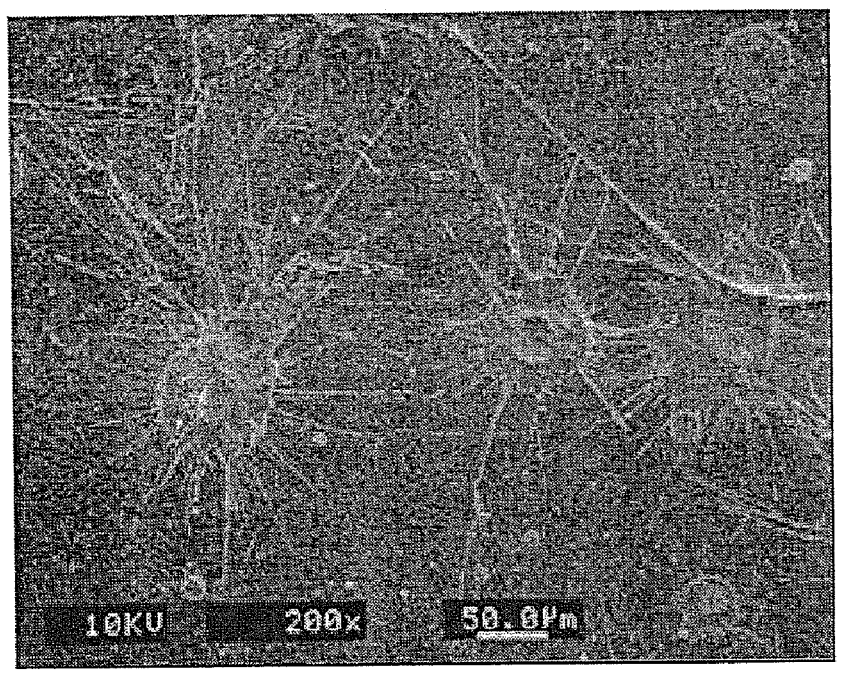
FIG. 14 is an electron micrograph of the surface of SUS304 L substrate in the thermal spray particle trapping test under the conditions of fuel 5.5 GPH and oxygen 2000 SCFH (Test 4-2).
Figure 14:
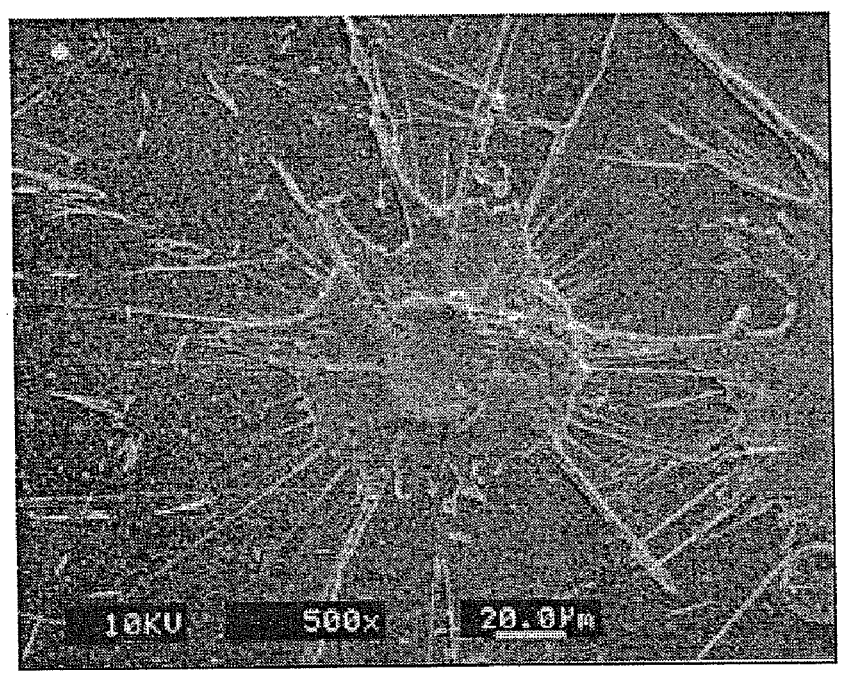
Figure 15:
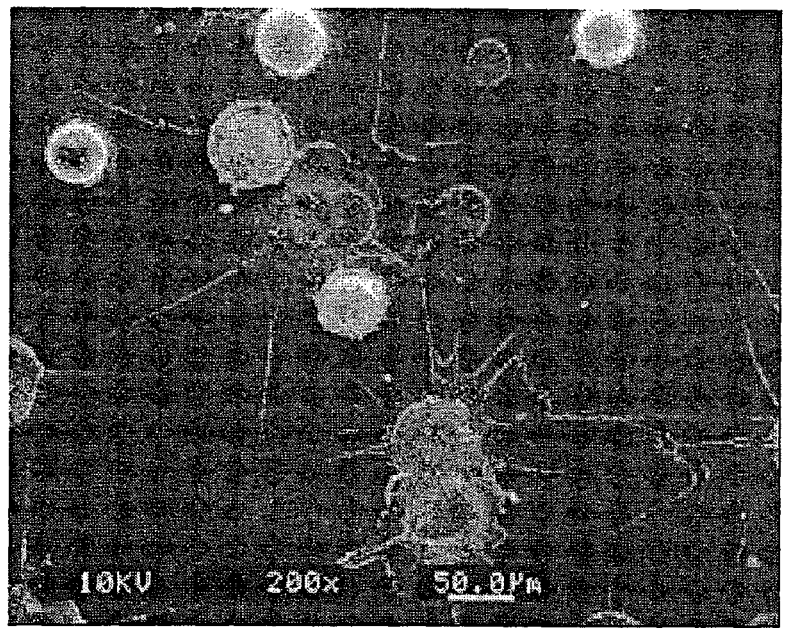
FIG. 15 is an electron micrograph of the surface of SUS304 L substrate in the thermal spray particle trapping test under the conditions of fuel 4.0 GPH and oxygen 1500 SCFH (Test 4-3).
Figure 15:
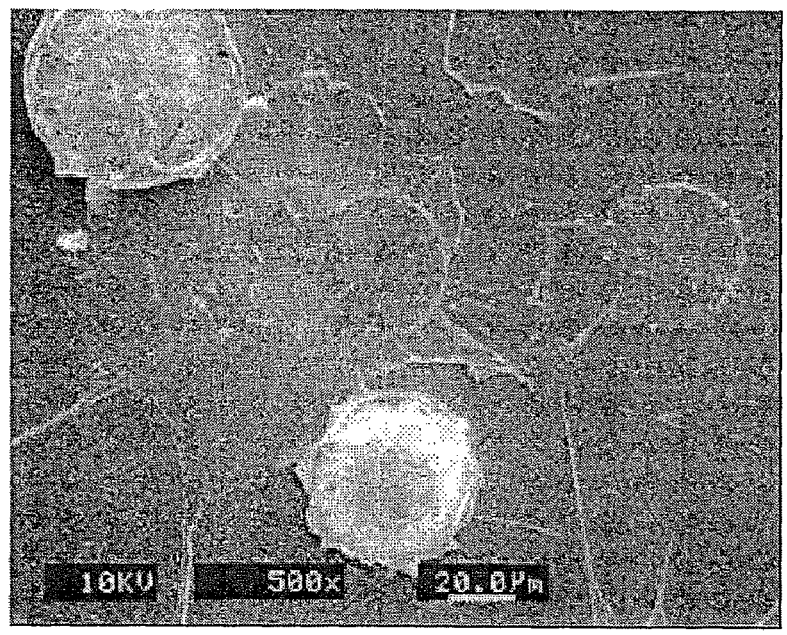
Figure 16:
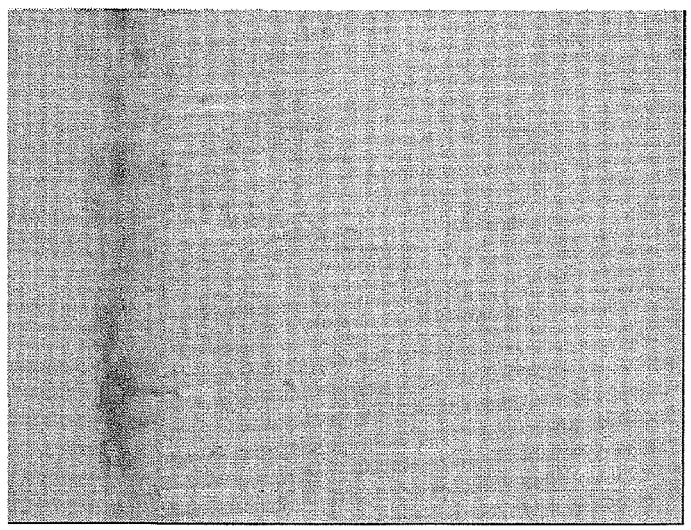
FIG. 16 is an electron micrograph of the cross section of the agar gel target in the thermal spray particle trapping test under the conditions of fuel 6.0 GPH and oxygen 2000 SCFH (Test 4-1).
Figure 17:
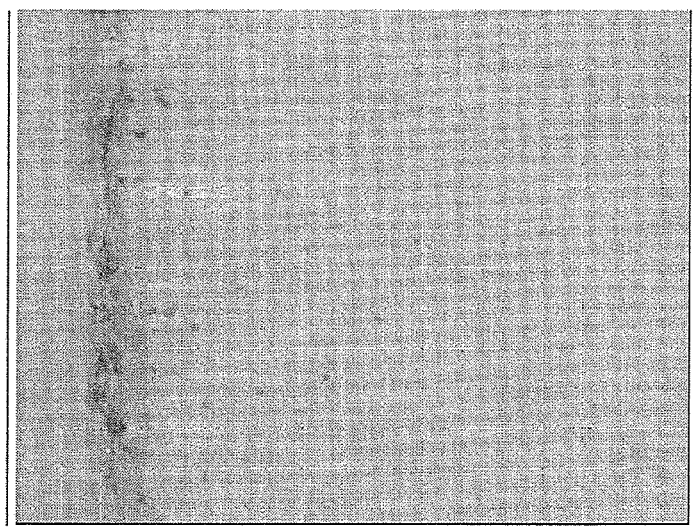
FIG. 17 is an electron micrograph of the cross section of the agar gel target in the thermal spray particle trapping test under the conditions of fuel 5.5 GPH and oxygen 2000 SCFH (Test 4-2).
Figure 18:
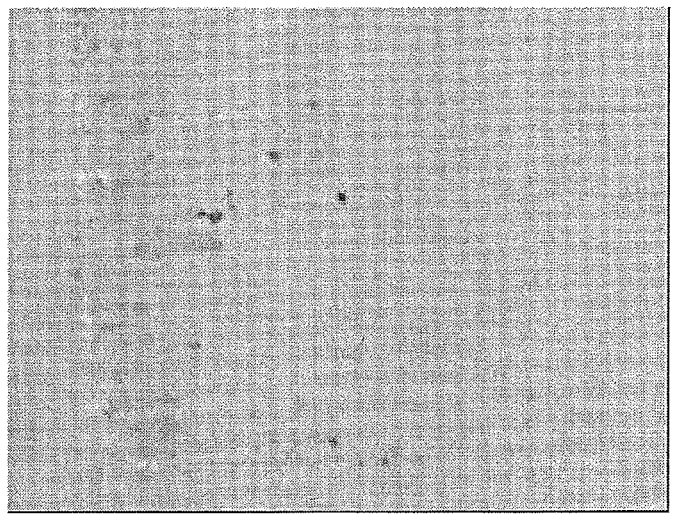
FIG. 18 is an electron micrograph of the cross section of the agar gel target in the thermal spray particle trapping test under the conditions of fuel 4.0 GPH and oxygen 1500 SCFH (Test 4-3).

| Test No. | Fuel (GPH) | Oxygen (SCFH) | Substrate image SUS304 L | Agar gel |
|---|---|---|---|---|
| 4-1 | 6.0 | 2000 | FIG. 13 | FIG. 16 |
| 4-2 | 5.5 | 2000 | FIG. 14 | FIG. 17 |
| 4-3 | 4.0 | 1500 | FIG. 15 | FIG. 18 |

FIGS. 13 to 15 show surface images of the substrates when the substrate SUS304 L plate was thermal sprayed under the condition of Tests 4-1 to 4-3.

In Test 4-1 (fuel: 6.0 GPH, oxygen: 2000 SCFH) and Test 4-2 (fuel: 5.5 GPH, oxygen: 2000 SCFH), the splat of thermal spray particles had a thinly collapsed circular or oval shape, or it consisted of a core that is thinly collapsed in a circular to oval shape at the center and thinly spread splashy sections around the core. Thermal spraying under these conditions produced a dense and homogeneous thermal sprayed coating of amorphous metallic glass by the accumulation of such splats.

On the other hand, in Test 4-3 (fuel: 4.0 GPH, oxygen: 1500 SCFH), as seen in FIG. 15, numerous thick splats with a nearly spherical shape without thin spreading were observed. There were few splats like those seen in FIGS. 13 and 14. In addition, the generation of splashy sections was suppressed. These are considered to be due to the low flame temperature. A dense thermal sprayed coating could not be obtained by the accumulation of such splats.

FIGS. 16 to 18 show a cross-sectional image of a gel when thermal spraying was conducted under the conditions of Tests 4-1 to 4-3 using agar gel (gel concentration: 7 weight %) as a substrate (target). When thermal spraying is carried out onto such hard agar gel, thermal spray particles in a molten state or supercooled liquid state cannot penetrate inside the gel, and they are trapped at the gel surface. Thermal spray particles in a solidified state can penetrate inside the gel, and they are trapped inside the gel. Accordingly, the condition of thermal spray particles on the substrate surface can be estimated by such a gel target test.

In Tests 4-1 to 4-2 (FIGS. 16 and 17), thermal spray particles hardly penetrated inside the gel, a large portion of them were trapped on the gel surface (black section on the gel surface).

On the other hand, in Test 4-3 (FIG. 18), a large portion of thermal spray particles penetrated inside the gel, and they were hardly trapped on the gel surface (black section on the gel surface is hardly recognizable).

Accordingly, it is considered that most thermal spray particles hit the substrate surface in a molten state or in a supercooled liquid state in Tests 4-1 and 4-2 while most thermal spray particles hit the substrate surface in a solidified state in Test 4-3.

Test Example 5

Thermal Spray Particle Trapping Test (2)

Another thermal spray particle trapping test was conducted by varying the temperature of the substrate surface and the particle size of thermal spray particles. Test conditions are as follows.

TABLE 5

Figure 19:
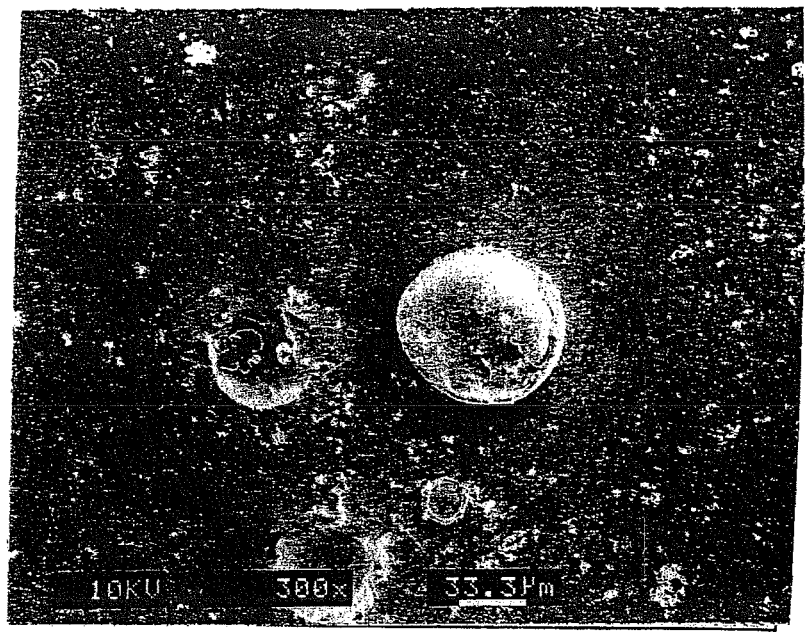
FIG. 19 is an electron micrograph of the substrate surface in the thermal spray particle trapping test with thermal spray powder of particle size equal to or less than 120 μm under the condition of ordinary substrate temperature (Test No. 5-1).
Figure 20:
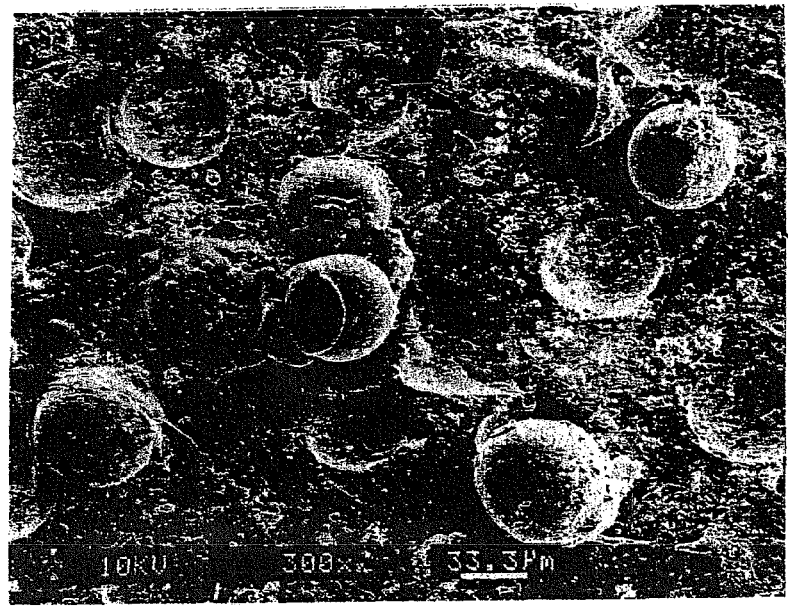
FIG. 20 is an electron micrograph of the substrate surface in the thermal spray particle trapping test with thermal spray powder of particle size equal to or less than 120 μm under the condition of 200° C. substrate temperature (Test No. 5-2).
Figure 21:
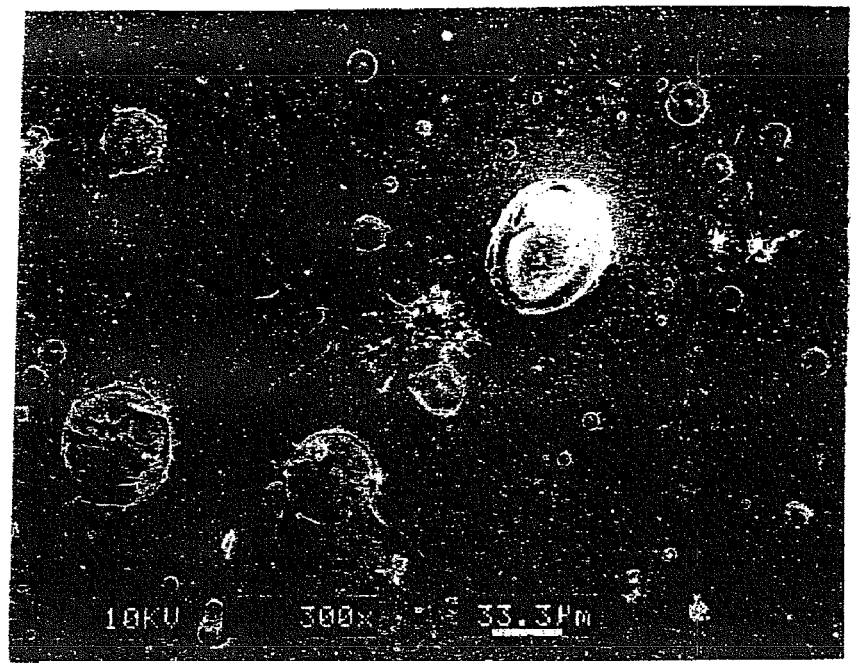
FIG. 21 is an electron micrograph of the substrate surface in the thermal spray particle trapping test with thermal spray powder of particle size equal to or less than 45 μm under the condition of ordinary substrate temperature (Test No. 5-3).
Figure 22:
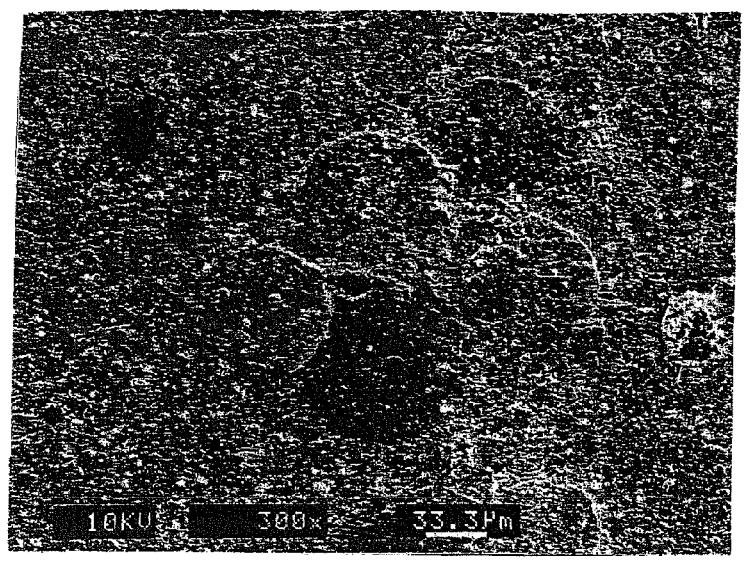
FIG. 22 is an electron micrograph of the substrate surface in the thermal spray particle trapping test with thermal spray powder of particle size equal to or less than 45 μm under the condition of 200° C. substrate temperature (Test No. 5-4).

| Test No. | Particle size | Substrate surface temperature | Substrate surface image |
|---|---|---|---|
| 5-1 | equal to or less than 120 μm | ordinary temperature (no heating) | FIG. 19 |
| 5-2 | equal to or less than 120 μm | 200° C. | FIG. 20 |
| 5-3 | equal to or less than 45 μm | ordinary temperature (no heating) | FIG. 21 |
| 5-4 | equal to or less than 45 μm | 200° C. | FIG. 22 |

*Substrate: SUS304 plate, fuel: kerosene, sprayed amount: 3.2 kg/hr, carrier gas pressure: 45 psi, thermal spray distance: 200 mm, The rest are the same as those of Test Example 1.

As seen in FIGS. 19 and 20, when the particle size is equal to or less than 120 μm (minus 120 μm sieve), the splat of thermal spray particles did not spread, and the splat was thick and nearly spherical at both substrate surface temperatures. In addition, dents, which are considered to be due to the thermal spray particle impact, were observed on the substrate surface. Under these conditions, the particle diameter was large and the particles were at a high speed. Thus, it is considered that thermal spray particles did not reach a molten state or supercooled liquid state, and they hit the substrate surface in a solidified state.

When the particle size is equal to or less than 45 μm (minus 45 μm sieve), at an ordinary substrate surface temperature, some non-spreading bad splats were observed here and there; however, numerous thinly collapsed and spreading good splats were observed as shown in FIG. 21. When the temperature of the substrate surface was 200° C., most splats collapsed very thinly and spread into circular or oval shape as shown in FIG. 22, which were excellent.

It is considered that the thermal spray particles heated with gas flame hit the substrate surface in the supercooled liquid state or in a completely molten state because the particle diameter was small.

If the splat thinly spreads, it is advantageous to the formation of a dense thermal sprayed coating. In addition, if the splat thinly spreads, the entire splat can be swiftly cooled and solidified. Thus, it is also advantageous to the formation of a homogeneous, amorphous thermal sprayed coating.

Test Example 6

Thermal Spraying Test

Under the same test conditions as those of Test Example 5, an actual thermal spraying test was conducted. In the thermal spraying test, a thermal spray gun was shuttled at a constant rate in parallel to the substrate surface to thermal spray the substrate surface along a straight line. One shuttle of the thermal spray gun was counted two times of thermal spraying. The substrate temperature was at 200° C. Test conditions were as follows.

TABLE 6

Figure 23:
FIG. 23 is an SEM micrograph of the cross section of the thermal sprayed coating and substrate in the thermal spraying test with thermal spray powder of particle size equal to or less than 45 μm under the conditions of 200° C. substrate temperature and 30 times of thermal spraying (Test No. 6-2).
Figure 24:
FIG. 24 is an SEM micrograph of the cross section of the thermal sprayed coating and substrate in the thermal spraying test with thermal spray powder of particle size equal to or less than 45 μm under the conditions of 200° C. substrate temperature and 58 times of thermal spraying (Test No. 6-3).

| Test No. | Particle size | Number of thermal spraying | Film thickness | Image of coating cross section | Durability (Aqua regia test) |
|---|---|---|---|---|---|
| 6-1 | equal to or less than 120 μm | 108 times | — | — | — |
| 6-2 | equal to or less than 45 μm | 30 times | 1.164 mm | FIG. 23 | ○ |
| 6-3 | equal to or less than 45 μm | 58 times | 2.087 mm | FIG. 24 | ○ |

*$Fe_{43}Cr_{16}Mo_{16}C_{15}B_{10}$ gas-atomized powder

In the case of the particle size equal to or less than 120 μm, a thermal sprayed coating was not formed on the substrate surface even after thermal spraying was repeated up to 108 times. As speculated from the results of the above-mentioned trapping test, it is considered that thermal spray particles hit the substrate surface in a solid state, and the adhesion to the substrate was low.

On the other hand, in the case of the particle size equal to or less than 45 μm, after 30 times of thermal spraying, a thermal sprayed coating of the maximum film thickness of 1.164 mm was formed. After 58 times of thermal spraying, a thermal sprayed coating of the maximum film thickness of 2.087 mm was formed.

Cross-sectional SEM micrographs for thermal sprayed coatings after 30 times and 58 times of thermal spraying are shown in FIG. 23 and FIG. 24, respectively. The number of pores, which are shown as black dots, in the coating is very few (porosity is equal to or less than 2%). In addition, each pore is independent, and no continuous pore that passes through the thermal sprayed coating was observed.

Generally, in the thermal spraying of metal, a porous film is often formed by trapping gas from the surrounding because thermal spray particles are cooled during a flight to be solidified nonuniformly due to the narrow temperature range of liquid. In the metallic glass thermal spraying of the present invention, a dense film can be formed because the metallic glass hit the substrate surface in the supercooled liquid state.

Accordingly, these thermal sprayed coatings are suggested to be excellent in the protection of the substrate surface against foreign factors.

Actually, in the aqua regia dipping test (25° C., 2 hours), the weight loss by corrosion was about 3%, which showed excellent corrosion resistance.

Figure 25:
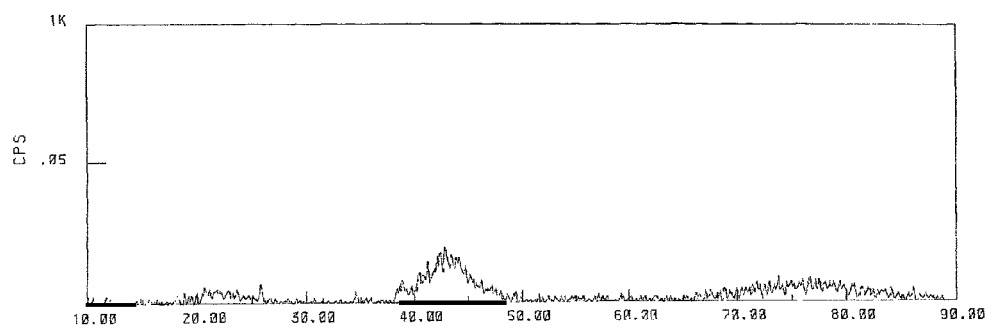
FIG. 25 is an X-ray diffraction pattern for the thermal sprayed coating in the thermal spraying test with thermal spray powder of particle size equal to or less than 45 μm under the conditions of 200° C. substrate temperature and 30 times of thermal spraying (Test No. 6-2).

X-ray diffraction analysis was conducted for the obtained thermal spray coating. FIG. 25 shows an X-ray diffraction pattern of the thermal sprayed coating of Test Example 6-2 (thermal spraying: 30 times). As seen from the figure, the obtained thermal sprayed coating was a metallic glass of an amorphous phase, which did not contain a crystalline phase and an oxide layer.

Generally, in thermal spraying in the atmosphere, metal becomes very oxidizable when the metal is melted to a molten liquid state at high temperature. Thus, an oxide phase is normally observed in the thermal sprayed coating. In the case of metallic glass, oxidation does not easily take place.

As described above, a very dense metallic glass amorphous coating can be formed by allowing thermal spray particles of the metallic glass to hit the substrate surface in the supercooled liquid state.

In the above example, metallic glass $Fe_{43}Cr_{16}Mo_{16}C_{15}B_{10}$ was thermal sprayed on a stainless steel plate. However, the metallic glass can be selected depending upon the functionality desired on the surface of various substrates and substrate kind.

In the above example, HVOF was used as the thermal spraying method. So far as the purpose of the present invention can be achieved, other thermal spraying methods such as atmospheric plasma spraying (APS), vacuum plasma spraying (VPS), and cold spraying can be used.

The adhesion strength between a substrate and the metallic glass layer can be increased by a surface roughening treatment such as blasting treatment of the substrate surface prior to the formation of a thermal sprayed coating of the present invention.

In the present invention, there is no pore that passes through the thermal sprayed coating. Therefore, sealing with resin or the like is not necessary after the formation of a thermal sprayed coating. However, various surface treatments can be conducted according to the purpose.

Test Example 7

Production of Metallic Glass Bulk

A metallic glass laminate was obtained by thermal spraying under the conditions of Table 7 (thickness of the thermal spray coating: about 1 mm).

TABLE 7

| Substrate | SUS304 L plate<br>Size: 50 × 100 × 5 mm<br>Substrate surface: has three convexes with the size of 30 × 20 × 1 mm.<br>Substrate surface has a mirror surface finish. |
|---|---|
| Thermal spray feedstock | $Fe_{43}Cr_{16}Mo_{16}C_{15}B_{10}$ gas-atomized powder<br>ΔTx: about 63° C.<br>Particle size: minus 53 μm sieve<br>(maximum particle diameter: 53 μm) |
| Thermal spray conditions | Powder carrier gas: $N_2$<br>Fuel: kerosene, 6.0 GPH<br>Oxygen: 2000 SCFH<br>Thermal spray distance (distance from the edge of the thermal spray gun to the surface of the substrate): 380 mm<br>Moving velocity of thermal spray gun: 200 mm/sec<br>Substrate surface temperature: 200° C. (heated with a hot plate) |

After the formation of a metallic glass laminate, the metallic glass layer was easily detached from the substrate by the exertion of light impact; thus, a metallic glass bulk was obtained. The convex of the substrate was accurately transferred to the separation surface of the obtained metallic glass bulk. In addition, the separation surface of the obtained metallic glass bulk was very smooth.

Test Example 8

Solder Corrosion Resistance

Water-atomized powder (particle diameter: 32-53 μm, amorphous) of the metallic glass with the composition of $Fe_{43}Cr_{16}V_{16}C_{15}B_{10}$ was used for thermal spraying with a high-velocity oxygen-fuel thermal spray system.

The raw material $Fe_{43}Cr_{16}V_{16}C_{15}B_{10}$ metallic glass powder was analyzed with a DSC (differential scanning calorimeter). The glass transition temperature (Tg) was 646.6° C., the crystallization initiation temperature (Tx) was 694.8° C., ΔTx was 48.2° C., and the melting point (Tm) was about 1094.8° C. The test conditions were as follows.

TABLE 8

| Substrate | SUS304 plate (surface roughening treatment) |
|---|---|
| Thermal spray feedstock | $Fe_{43}Cr_{16}V_{16}C_{15}B_{10}$ gas-atomized powder ΔTx: about 48° C. Particle size: 32-53 μm |
| Thermal spray conditions | Powder carrier gas: $N_2$ Fuel: kerosene, 6.0 GPH Oxygen: 2000 SCFH Thermal spray distance (distance from the tip of the thermal spray gun to the surface of the substrate): 200 mm Moving velocity of thermal spray gun: 200 mm/sec Substrate surface temperature: 200° C. |

Immediately after the start of thermal spraying on the substrate surface, gas flame and thermal spray particles to the substrate surface were interrupted with an interrupting plate. The shapes of individual splats before the splat accumulation were examined. It was found that the splat had collapsed and spread to an extremely thin flat shape. Thus, it was considered that the material hit against the substrate surface in a molten state or supercooled liquid state.

When thermal spraying was continuously conducted without an interrupting plate, thermal spray coatings with various thickness could be formed on the substrate surface depending on the thermal spray density; thus, thermal spray coatings with a thickness equal to or more than 0.01 mm could be formed. It was also possible to form coatings of a thickness equal to or more than 0.1 mm, for example, coating of a thickness of 2-3 mm. The thermal sprayed coating was firmly bonded on the substrate surface. In addition, it was confirmed that the thermal sprayed coating was completely amorphous by X-ray diffraction. Its cross section was observed with an electron microscope. As a result, the thermal sprayed coating was found to be very dense with almost no pores, and no continuous pore was recognized. In addition, no oxide layer formation was observed.

These results are due to the collision of thermal spray metallic glass particles, in a supercooled liquid state, to the substrate surface.

In order to evaluate the corrosion resistance, a test specimen (about 5×20×80 mm) of a thermal sprayed coating layer of metallic glass was obtained from this laminate. In addition, the surface of SUS304 plate (about 5×20×80 mm) was polished with emery paper and used as a comparative test specimen.

Lead-free solder flux was applied on the surfaces of these test specimens. Then dipping and raising of these specimens was repeated into and out of the molten lead-free solder Sn-3Ag-0.5Cu (550° C.) for 6 hours at the rate of dipping during 3 seconds and raising during 2 seconds. The dipping distance was about 20 mm along the major axis from the one end of the test specimen.

After the test, molten solder adhering to the surface of the test specimen was wiped off, and the appearance was observed. Significant corrosion (erosion) was recognized on the comparative test specimen; but not observed on the metallic glass test specimen.

The weight changes for the test specimens before and after the test are shown in Table 9. In the comparative test specimen, an obvious weight loss due to erosion was observed after the test. In the metallic glass test specimen, however, almost no weight change was observed before and after the test.

TABLE 9

| Specimen | Weight loss |
|---|---|
| Metallic glass test specimen | none observed |
| Comparative test specimen (SUS304) | observed (about 6% weight loss) |

Figure 26:
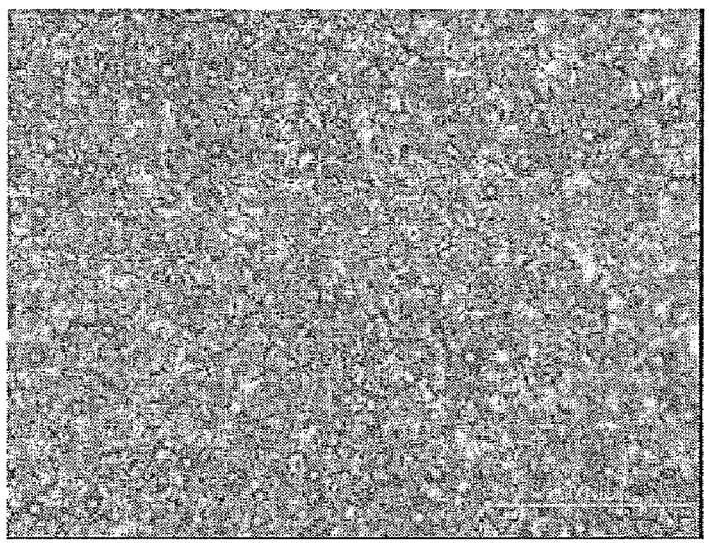
FIG. 26 shows surface images of (a) a metallic glass laminate in one example of the present invention (Test Example 1) and (b) a special surface-nitrided plate for solder-corrosion resistance (Comparative Example) after being dipped into the molten lead-free solder Sn-3Ag-0.5Cu (550° C.) for 96 hours.
Figure 26:

FIG. 26 is a surface image of (a) for the laminate of above-mentioned Test Example 1 and (b) a special surface-nitrided plate for solder-corrosion resistance (Surf Treatment by Kanuc Corporation) after testing for 96 hours under the same solder dipping conditions described above. In the case of the special nitrided plate shown in FIG. 26(b), significant erosion was recognized at the dipped section. In contrast, the laminate of the present invention, shown in FIG. 26(a), did not show any surface change before and after the test; thus, it is clear that no erosion took place.

As described above, the metallic glass coating of the present invention has an excellent corrosion resistance against solder especially against lead-free solder. Therefore, in the various members of soldering equipment, by forming this type of metallic glass coating on contact surface to molten solder, it is possible to drastically improve its corrosion resistance and achieve a long life.

In addition, a die pattern can be transferred, with high precision, to the surface of the metallic glass layer by pressing any laminate obtained in respective test examples in the supercooled liquid temperature range.

What is claimed is:

1. A metallic glass laminate, wherein a thermal sprayed coating layer of a metallic glass of an amorphous phase is formed on a substrate surface and no continuous pore (pinhole) through the thermal sprayed coating layer of the metallic glass is present, wherein the supercooled liquid temperature range ΔTx of the metallic glass is equal to or more than 30° C., and wherein the porosity of the thermal sprayed coating layer of the metallic glass is equal to or less than 2%.

2. The metallic glass laminate according to claim 1, wherein the thermal sprayed coating layer of the metallic glass is formed by deposition and solidification of at least part of the metallic glass powder in a supercooled liquid state on the substrate surface.

3. The metallic glass laminate according to claim 1, wherein metallic glass of amorphous phase prepared in advance is used as a theiuial spraying material to form the thermal sprayed coating layer of the metallic glass.

4. The metallic glass laminate according to claim 1, wherein the thickness of the thermal sprayed coating layer of the metallic glass is equal to or more than 10 μm.

5. The metallic glass laminate according to claim 1, wherein the thermal sprayed coating is a high-velocity oxygen-fuel thermal sprayed coating.

6. The metallic glass laminate according to claim 1, wherein there is lamination of a thermal splayed particle, which is thinly collapsed in a circular to oval shapes or has a core that is thinly collapsed in a circular to oval shape at the center, in the thermal sprayed coating layer of the metallic glass.

7. The metallic glass laminate according to claim 1, wherein the metallic glass consists of a plurality of elements and contains at least one element from the group of Fe, Co, Ni, Ti, Zr, Mg, Cu, and Pd as its constituent element.

8. The metallic glass laminate according to claim 7, wherein the metallic glass contains Fe in a range of 30-80 atomic % as its constituent element.

9. The metallic glass laminate according to claim 1, wherein the substrate is metal or ceramic.

10. The metallic glass laminate according to claim 9, wherein the substrate is a light metal having a specific gravity equal to or less than 3.0.

11. The metallic glass laminate according to claim 1, wherein the thermal sprayed coating layer of the metallic glass formed on the substrate surface has a pattern.

12. The metallic glass laminate according to claim 1, wherein the substrate surface has a convexo-concave pattern and the thermal sprayed coating layer of the metallic glass is formed thereon.

13. The metallic glass laminate according to claim 1, wherein a surface of the thermal sprayed coating layer of the metallic glass has at least one of a concavo-convex pattern and a mirror-like smooth surface.

14. The metallic glass laminate of claim 13, wherein the thickness of the thermal sprayed coating layer of the metallic glass at the thin section is equal to or more than 0.1 mm.

15. The metallic glass laminate according to claim 1 wherein the thermal sprayed coating layer of the metallic glass absorbs hydrogen under a hydrogen atmosphere to change an electrical characteristic value thereof.

16. A hydrogen sensor, wherein the metallic glass laminate according to claim 15 or a metallic glass bulk obtained by removing the substrate from the metallic glass laminate is applied.

17. A metallic glass bulk, wherein the bulk is obtained by removing the substrate from the metallic glass laminate according to claim 1.

18. The metallic glass laminate according to claim 1, wherein the substrate is a porous material.

19. The metallic glass laminate according to claim 18, wherein the thermal sprayed coating layer of the metallic glass has gas selective permeability.

20. The metallic glass laminate according to claim 19, wherein the selected gas is hydrogen.

21. The metallic glass laminate according to claim 18, wherein the thickness of the thermal sprayed coating layer of metallic glass is 1-1000 μm.

22. The metallic glass laminate according to claim 18, wherein the pore diameter of the porous material is in the range of 0.1-1000 μm.

23. The metallic glass laminate according to claim 18, wherein the shape of the laminate is tubular.

24. A gas separation membrane, wherein the metallic glass laminate according to claim 18 is applied.

25. The metallic glass laminate according to claim 1, wherein the thermal sprayed coating layer of metallic glass has crystallization degree of 10% or lower.

26. A method of producing the metallic glass laminate of claim 1, comprising thermal spraying amorphous metallic glass powder on the substrate surface, said thermal spraying comprising
   (a) heating the amorphous metallic glass powder to at least the glass transition temperature and below the crystallization starting temperature to convert at least a part of the amorphous glass powder to a supercooled liquid state, and
   (b) depositing and solidifying the metallic glass powder on the substrate to produce the metallic glass laminate.

27. The method of claim 26, wherein the thermal spraying is high-velocity oxygen-fuel thermal spraying.

28. The method of claim 26, wherein the thermal spraying is conducted on a substrate having a surface temperature of at least 100° C.

29. The method of claim 26, further comprising removing the substrate from the glass laminate to form a metallic glass bulk.

30. A method of claim 26, further comprising:
   pressing the surface of the thermal sprayed coating layer of the metallic glass laminate with a die in the supercooled temperature range of the metallic glass to transfer the die pattern to the surface.

31. The method of claim 30, wherein the thermal spraying is high-velocity oxygen-fuel thermal spraying.

32. The method of claim 30, wherein the thickness of the thermal sprayed coating layer of the metallic glass laminate to be pressed with the die is at least 0.1 mm.

33. The method of claim 26, wherein the substrate is porous.

34. A solder-corrosion resistant member, wherein a contact surface to molten solder or an underlayer of a contact surface to molten solder is formed of a thermal sprayed coating layer of a metallic glass of an amorphous phase formed on a substrate surface and no continuous pore (pinhole) through the thermal sprayed coating layer of the metallic glass is present, wherein the supercooled liquid temperature range ΔTx of the metallic glass is equal to or more than 30° C., and wherein the porosity of the thermal sprayed coating layer of the metallic glass is equal to or less than 2%.

35. The solder-corrosion resistant member according to claim 34, wherein the solder is a lead-free solder.

36. A soldering iron tip, wherein the tip is made of a solder-corrosion resistant member according to claim 34.

37. A solder bath, wherein the bath is made of a solder-corrosion resistant member according to claim 34.

* * * * *